(12) United States Patent
Lickfold et al.

(10) Patent No.: US 9,008,943 B2
(45) Date of Patent: Apr. 14, 2015

(54) SYSTEM AND METHOD FOR CONTROLLING A SINGLE-SPOOL TURBOSHAFT ENGINE

(71) Applicant: Williams International Co., L.L.C., Walled Lake, MI (US)

(72) Inventors: Ray D. Lickfold, Brighton, MI (US); Gregg Williams, Walled Lake, MI (US); Robert S. Thompson, Jr., White Lake, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 0 days.

(21) Appl. No.: 13/956,439

(22) Filed: Aug. 1, 2013

(65) Prior Publication Data

US 2014/0039775 A1    Feb. 6, 2014

Related U.S. Application Data

(62) Division of application No. 13/032,792, filed on Feb. 23, 2011, now Pat. No. 8,566,000.

(60) Provisional application No. 61/307,086, filed on Feb. 23, 2010.

(51) Int. Cl.
  *G06F 19/00* (2011.01)
  *G06G 7/70* (2006.01)
  *F02C 9/00* (2006.01)
  *F02G 3/00* (2006.01)
  (Continued)

(52) U.S. Cl.
  CPC ............. *F02C 9/32* (2013.01); *F05D 2270/304* (2013.01); *F05D 2270/07* (2013.01)

(58) Field of Classification Search
  CPC ............... F02C 9/32; F02C 9/26; F02C 9/58; F05D 2270/07; F05D 2270/304; F05D 2220/32; F05D 2220/323; F05D 2270/02
  USPC ............ 701/100–115, 123; 415/13–50; 60/39.24, 39.281, 39.282, 239, 240, 60/243, 801, 802, 39.1, 39.01, 785
  See application file for complete search history.

(56) References Cited

U.S. PATENT DOCUMENTS

| | | | | |
|---|---|---|---|---|
| 2,645,293 | A | * | 7/1953 | Ogle et al. ................ 416/28 |
| 2,751,026 | A | * | 6/1956 | Lee, II ...................... 416/43 |
| 3,092,966 | A | | 6/1963 | Kuzmitz |

(Continued)

OTHER PUBLICATIONS 2.3 Standard Deviation, Columbia University, Feb. 9, 2008 version (courtsey of Internet Wayback Archive).*

*Primary Examiner* — Khoi Tran
*Assistant Examiner* — Abby Lin
(74) *Attorney, Agent, or Firm* — Raggio & Dinnin, P.C.

(57) ABSTRACT

One of a controllable load and a fuel flow to a single-spool turboshaft engine is controlled so that a rotational speed of a single-spool turboshaft engine is substantially regulated to a level corresponding to a corrected rotational speed command, and the other of the fuel flow and the controllable load is controlled so that a torque transmitted from the single-spool turboshaft engine to the controllable load is substantially regulated to a level corresponding to a corrected torque command. Under at least one operating condition, the corrected rotational speed command is determined so as to minimize or nearly minimize a measure of fuel consumption by the single-spool turboshaft engine when operated so that the torque transmitted to the controllable load corresponds to the corrected torque command.

21 Claims, 18 Drawing Sheets

(51) Int. Cl.
*F02K 1/16* (2006.01)
*F02C 9/32* (2006.01)

(56) References Cited

U.S. PATENT DOCUMENTS

| | | | |
|---|---|---|---|
| 3,332,233 A | 7/1967 | McQueen | |
| 3,902,315 A * | 9/1975 | Martin | 60/39.091 |
| 3,922,850 A * | 12/1975 | McCabe | 60/39.281 |
| 4,159,625 A | 7/1979 | Kerr | |
| 4,258,545 A | 3/1981 | Slater | |
| 4,286,324 A * | 8/1981 | Ingram | 701/123 |
| 4,425,614 A | 1/1984 | Barron et al. | |
| 4,488,236 A | 12/1984 | Morrison et al. | |
| 4,522,026 A * | 6/1985 | Peterson et al. | 60/39.281 |
| 4,648,797 A | 3/1987 | Martin | |
| 4,772,180 A * | 9/1988 | Walker et al. | 416/33 |
| 4,838,126 A * | 6/1989 | Wilfinger et al. | 477/129 |
| 4,947,334 A | 8/1990 | Massey et al. | |
| 5,274,558 A | 12/1993 | High et al. | |
| 5,315,819 A | 5/1994 | Page et al. | |
| 5,363,317 A * | 11/1994 | Rice et al. | 702/34 |
| 5,775,090 A | 7/1998 | Skarvan | |
| 6,000,215 A | 12/1999 | Roberts, Jr. | |
| 6,253,537 B1 * | 7/2001 | Suenaga et al. | 60/773 |
| 6,305,169 B1 | 10/2001 | Mallof | |
| 6,748,744 B2 | 6/2004 | Peplow et al. | |
| 7,712,299 B2 * | 5/2010 | Wolflick et al. | 60/39.091 |
| 2004/0154385 A1 | 8/2004 | Acker | |
| 2006/0271250 A1 | 11/2006 | Dubeck et al. | |
| 2008/0243383 A1 | 10/2008 | Lin | |
| 2010/0088003 A1 | 4/2010 | Meacham | |
| 2010/0153025 A1 * | 6/2010 | Ling et al. | 702/41 |
| 2011/0173988 A1 | 7/2011 | Sweet et al. | |

* cited by examiner

SYSTEM AND METHOD FOR CONTROLLING A SINGLE-SPOOL TURBOSHAFT ENGINE

CROSS-REFERENCE TO RELATED APPLICATIONS

The instant application is a division of U.S. application Ser. No. 13/032,792 filed on 23 Feb. 2011, which claims the benefit of prior U.S. Provisional Application Ser. No. 61/307,086 filed on 23 Feb. 2010, both of which are incorporated herein by reference in their entireties.

DESCRIPTION OF EMBODIMENT(S)

Figure 1:
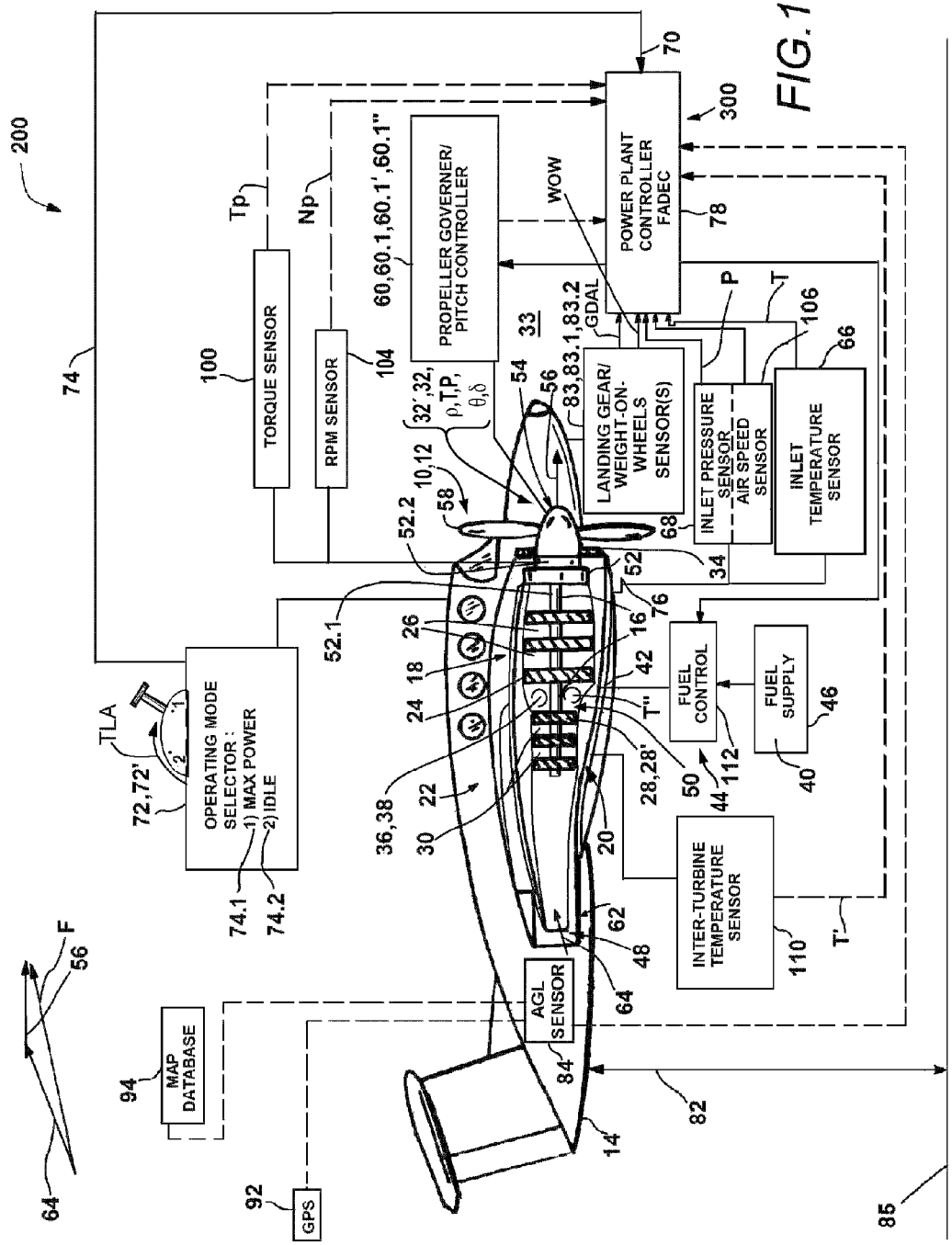
FIG. 1 illustrates a schematic block diagram of a system for controlling a single-spool turboprop engine.
Figure 2A:
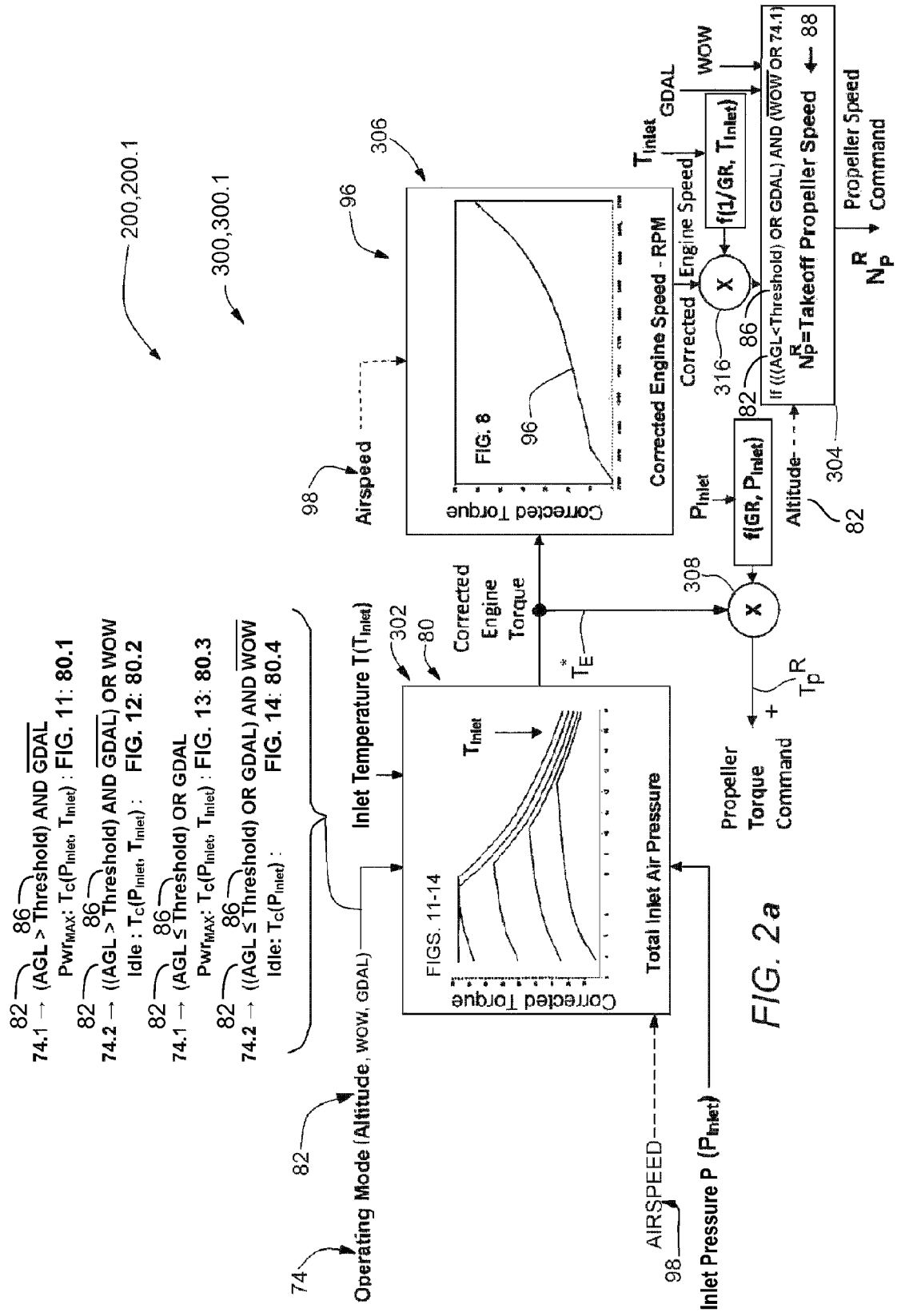
FIGS. 2a and 2b illustrate a block diagram of a first aspect of a system and method for controlling a single-spool turboprop engine.
Figure 2B:
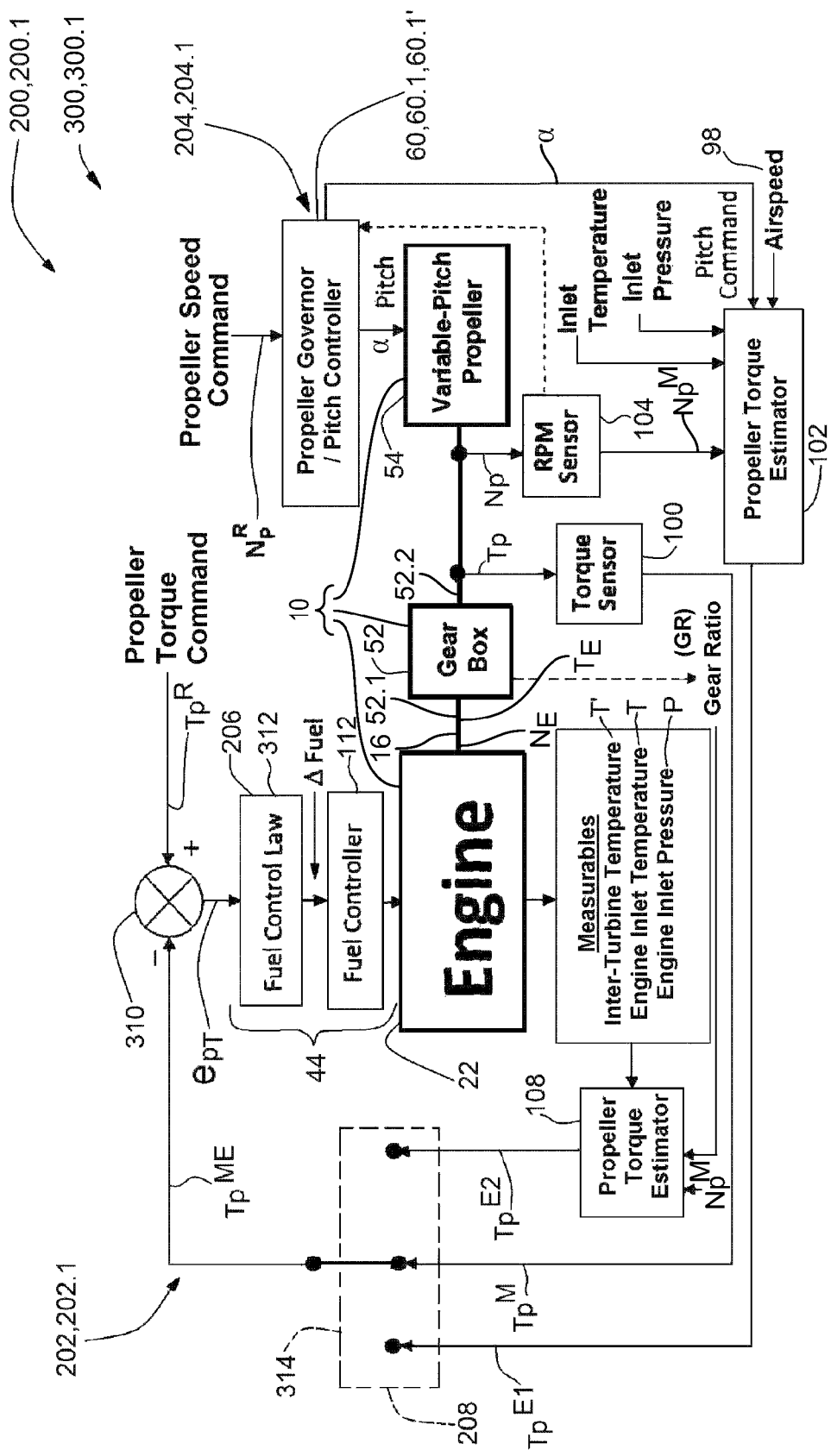

Referring to FIGS. 1 and 2b, a single-spool turboprop engine 10 is incorporated as a powerplant 12 of an aircraft 14. The single-spool turboprop engine 10 comprises a single shaft 16, also known as a spool, to which are coupled an associated compressor 18 and an associated turbine 20 of an underlying gas turbine engine 22, wherein the compressor 18 comprises one or more bladed compressor rotors 24 that cooperate with associated compressor stator vanes 26 therebetween, and the turbine 20 comprises one or more bladed turbine rotors 28 that cooperate with associated turbine nozzle vanes 30 therebetween. The compressor 18 compresses incoming inlet air 32 from the atmosphere 33 received through an inlet 34 of the single-spool turboprop engine 10, and the resulting compressed air 36 is directed into a combustion chamber 38 of the gas turbine engine 22 and then mixed and combusted with fuel 40 injected from an associated fuel injector 42 under control of an associated fuel control system 44 and supplied by an associated fuel supply 46. The resulting exhaust gases 48 from the combustion of the fuel 40 and compressed air 36 are directed through a turbine nozzle 50 and then onto the blades 28' of the one or more bladed turbine rotors 28 so as to provide for transferring power thereto, which power is then coupled therefrom to the shaft 16 to drive the compressor 18.

The shaft 16 is also coupled to the input 52.1 of a gearbox 52, the output 52.2 of which is coupled to a variable pitch propeller assembly 54 of the single-spool turboprop engine 10, so as to provide for coupling power from the turbine 20 to the variable pitch propeller assembly 54 by transmitting thereto a propeller torque $T_P$ at a corresponding rotational propeller speed $N_P$, which provides for generating propeller-generated thrust 56 therefrom with an associated plurality of propeller blades 58 thereof. The variable pitch propeller assembly 54 incorporates a propeller blade pitch control system 60 that provides for controlling the propeller blade pitch $\alpha$ of each of the propeller blades 58 to a common propeller blade pitch $\alpha$. For example, in one embodiment, the propeller blade pitch control system 60 comprises a governor 60.1 that regulates the rotational propeller speed $N_P$ of the variable pitch propeller assembly 54 by controlling the common propeller blade pitch $\alpha$ of the propeller blades 58. For example, in one embodiment, the governor 60.1 comprises a mechanical flyball-style governor 60.1' incorporating a rotating mass acting against a spring-loaded bias force, wherein the propeller blade pitch $\alpha$ of the propeller blades 58 is responsive to the extension of the rotating mass from its center of rotation, and the associated spring-loaded bias force is mechanically controlled by the position of an associated control element, for example, by a cable or an actuator. The amount of propeller-generated thrust 56 generated by the propeller blades 58 is responsive to the rotational propeller speed $N_P$ and the common propeller blade pitch $\alpha$ of the variable pitch propeller assembly 54, and to the density $\rho$ of the air 32' interacting therewith, wherein the density $\rho$ of the air 32' is responsive to the temperature T and pressure P thereof.

After driving the turbine 20, the exhaust gases 48 are discharged through and from an exhaust nozzle 62 of the single-spool turboprop engine 10, and into the atmosphere 33, whereupon, the discharge thereof generates an associated jet thrust 64 that acts, together with the propeller-generated thrust 56, to propel the aircraft 14 forwards. Accordingly, the total thrust F acting to propel the aircraft 14 forwards is given by the vector sum of jet thrust 64 and propeller-generated thrust 56.

The gearbox 52 is configured so that the rotational propeller speed $N_P$ of the output 52.2 thereof coupled to the variable pitch propeller assembly 54 is substantially less than the rotational engine speed $N_E$ of the shaft 16 of the gas turbine engine 22 coupled to the input 52.1 of the gearbox 52, wherein the associated gear ratio GR of the gearbox 52 is given as the ratio of the rotational engine speed $N_E$ of the input 52.1 to the rotational propeller speed $N_P$ of the output 52.2, and accordingly is also given as the ratio of the propeller torque $T_P$ at the output 52.2 of the gearbox 52 to the engine torque $T_E$ at the input 52.1 from the shaft 16 of the gas turbine engine 22. With the shaft 16 of the gas turbine engine 22 mechanically coupled by the gearbox 52 to the variable pitch propeller assembly 54, and the with the compressor 18 and turbine 20 directly mechanically connected to the shaft 16, the compressor 18, turbine 20 and variable pitch propeller assembly 54 all rotate in synchronism with one another, and the gearbox 52 provides for directly coupling torque between the shaft 16 and the variable pitch propeller assembly 54.

At a given rotational engine speed $N_E$ of the gas turbine engine 22, the associated engine torque $T_E$ therefrom can be rapidly changed by changing the flow of fuel 40 to the combustion chamber 38. For example, as the flow of fuel 40 to the combustion chamber 38 is increased, the amount of exhaust gases 48 generated therein increases, which increases the mass flow rate of exhaust gases 48 through the turbine 20, thereby increasing the resulting amount of engine torque $T_E$ from the bladed turbine rotors 28 and shaft 16. The rotational engine speed $N_E$ of the gas turbine engine 22 can be changed responsive to a change in the level of a rotational propeller speed reference $N_P^R$—also referred to herein as a propeller speed command—to which—in accordance with the first aspect illustrated in FIG. 2b—the rotational propeller speed $N_P$ of the variable pitch propeller assembly 54 is regulated by the governor 60.1, further responsive to the engine torque $T_E$ on the shaft 16. However, for a given level of engine torque $T_E$ on the shaft 16, the corresponding maximum rate of change of rotational engine speed $N_E$ of the gas turbine engine 22 is limited by the effective rotational inertia of the shaft 16, which includes the rotational moments of inertia of the compressor 18 and the turbine 20, the gearbox 52, and the effective moment of inertia of variable pitch propeller assembly 54 as reflected at the input 52.1 of the gearbox 52. Accordingly, the rate at which the rotational engine speed $N_E$ of the gas turbine engine 22 can be changed is substantially less than the corresponding rate at which engine torque $T_E$ can be changed.

At a given rotational engine speed $N_E$ of the gas turbine engine 22, as the associated engine torque $T_E$ is increased, the corresponding pressure and temperature in the combustion chamber 38 also increases, which increases the backpressure acting against the flow of compressed air 36 from the compressor 18. However, this increase in backpressure is limited by stall or surge of the compressor 18, causing the output of the compressor 18 to be at least substantially reduced, thereby substantially reducing the flow of compressed air 36 to the combustion chamber 38, thereby substantially reducing the power generated thereby. A stall or surge may also possibly result in an explosive backflow that can cause excessive associated temperatures and possibly associated mechanical damage to the gas turbine engine 22. Generally, the maximum amount of engine torque $T_E$ that can be generated by the gas turbine engine 22 without causing a stall or surge of the compressor 18 is dependent upon the rotational engine speed $N_E$ of the gas turbine engine 22, the underlying turbine inlet temperature T'', the total inlet air temperature T (also indicated as $T_{Inlet}$ in FIGS. 2a and 16a) and the total inlet air pressure P (also indicated as $P_{Inlet}$ in FIGS. 2a and 16a) of the inlet air 32. The total inlet air temperature T and total inlet air pressure P are also referred to the stagnation temperature T and stagnation pressure P, respectively.

Referring also to FIGS. 2a and 2b, a first aspect of a single-spool turboprop engine control system 200, 200.1 provides for controlling the single-spool turboprop engine 10 so as to prevent compressor stall or surge and assure that the single-spool turboprop engine 10 is operated within acceptable mechanical and thermal limits while either minimizing fuel consumption at a given level of total thrust F when in flight either above a given ground-proximate altitude or with the landing gear down, or when operating on the ground except for takeoff, or providing for operating the gas turbine engine 22 at rotational engine speed $N_E$ suitable for takeoff when in flight at or below a ground-proximate altitude above ground level (AGL) or during takeoff. As one of ordinary skill in the art will understand, the set of reference characters 200, 200.1 herein and in FIGS. 2a and 2b indicates that the first aspect 200.1 is a particular species of a generic single-spool turboprop engine control system 200. The generic single-spool turboprop engine control system 200 controls both the flow of fuel 40 to the gas turbine engine 22 and the rotational propeller speed reference $N_P{}^R$ of the governor 60.1 associated with the propeller blade pitch control system 60, responsive to measurements of the total inlet air temperature T and pressure P of the inlet air 32 from respective inlet air temperature 66 and pressure 68 sensors, a measurement or estimate of propeller torque $T_P$ at the output 52.2 of the gearbox 52 operatively coupled to the variable pitch propeller assembly 54, and an operating mode input 70 from a single-lever operating mode selector 72 under control of the pilot of the aircraft 14 and used to select the operating mode 74 corresponding to the associated operating power level of the gas turbine engine 22 so as to provide for generating an associated power-level command responsive thereto. In one embodiment, the inlet air temperature 66 and pressure 68 sensors are incorporated in a pitot tube 76 and provide measures of total inlet air temperature T and total inlet air pressure P, respectively. The operating mode selector 72 is set by the pilot to select the particular operating mode of the single-spool turboprop engine 10, for example, in one embodiment, either from the following two predefined operating modes 74: 1) "Maximum Power" mode 74.1 and 2) "Idle" mode 74.2 defined by associated detents on the operating mode selector 72, or from a continuum of power levels therebetween. The "Maximum Power" mode 74.1 provides for maximum power from the gas turbine engine 22 and maximum thrust from the variable pitch propeller assembly 54, and is used for takeoff, climb and cruise. The "Idle" mode 74.2 provides either a reduced level of power from the gas turbine engine 22 for the aircraft 14 to descend in altitude while in flight, or provides for a minimum level of power from the gas turbine engine 22 sufficient for ground operations, with minimal associated noise, wherein the particular mode of operation under the "Idle" mode 74.2 is automatically selected as described more fully hereinbelow responsive to the detected operating condition of the aircraft 14. For a continuously-adjustable operating mode selector 72—otherwise known as a thrust lever 72' positioned at an associated thrust lever angle TLA—positioned between two of the predefined operating modes, the associated power level is interpolated between the respective power levels of the respective predefined operating modes. Additional operating modes may also be predefined, for example, for either "Climb" or "Cruise", or both, if the associated typically used power levels are substantially different from the "Maximum Power" mode 74.1. Furthermore, additional "Idle" modes may also be predefined, for example, a relatively higher rotational engine speed $N_E$ "Deice Idle" to provide sufficient heat to either prevent or eliminate icing, or separate "Flight Idle" and "Ground Idle" as described more fully hereinbelow. The various "Idle" modes could be either incorporated as separate detents on the operating mode selector 72, or one or more of the separate "Idle" modes could be separately activated by a separate switch. For example, a "Deice Idle" could be separately activated by a "Deice switch" that is independent of the position of the operating mode selector 72. In any of these modes, the operating power level of the gas turbine engine 22 is subject to limitations on the associated mechanical loads and temperatures within the single-spool turboprop engine 10, and to operation of such that the compressor 18 is not subject to stall or surge. For example, mechanical loads subject to limitation include torque in the shaft 16, and temperatures subject to limitation include the turbine inlet temperature T", i.e. the temperature of the exhaust gases 48 in the turbine nozzle 50 upstream of the first bladed turbine rotor 28. However, the level of the mechanical and thermal limitations can be different for different operating modes, for example, because of different associated duty cycles in the operation of the gas turbine engine 22. For example, the level of turbine inlet temperature T" that can be tolerated is highest for a "Takeoff" mode, and successively lower for "Climb" and "Cruise" modes, respectively, corresponding to successively increasing expected duty cycles of the modes, respectively, wherein a "Cruise" mode would provide for a 100 percent duty cycle. Alternatively, a single corresponding "Maximum Power" mode 74.1 could be configured assuming a 100 percent duty cycle. A turbine inlet temperature T" that is too high for too long can lead to failure of one or more bladed turbine rotors 28. However, for relatively short periods of time, a relatively higher turbine inlet temperature T" can be tolerated without danger of such failure.

Accordingly, the generic single-spool turboprop engine control system 200 is responsive to a power-level command responsive to a single manual power-level input from the pilot via the operating mode selector 72, which, for example, may comprise either a single lever, slide or control knob, either real or virtual, by which the pilot commands the power level at which the single-spool turboprop engine 10 is to operate, after which the generic single-spool turboprop engine control system 200 automatically controls both the flow of fuel 40 to the associated gas turbine engine 22 and the common propeller blade pitch α of the associated variable pitch propeller assembly 54 so as to automatically regulate the associated rotational speed and torque of the single-spool turboprop engine 10 so as to achieve the commanded power level under any given operating condition. Alternatively, the power-level command may be provided either as an automatically generated signal, for example, from a controller of an autonomous aircraft 14, or from a remotely generated signal, for example, from a pilot-operated operating mode selector 72 at a location that is relatively remote with respect to the aircraft 14.

The generic single-spool turboprop engine control system 200 comprises an associated generic control algorithm 300, for example, implemented by an associated powerplant controller 78 in communication with associated sensors and actuators, wherein the powerplant controller 78 is sometimes also referred to as a Full Authority Digital Engine Control, or FADEC. For example, in one embodiment, the powerplant controller 78 comprises a computer and the associated generic control algorithm 300 is implemented in software therein. Alternatively, the powerplant controller 78 could be implemented using special purpose digital or analog hardware.

Referring to FIG. 2a, in accordance with a first step (302) of the generic control algorithm 300, a torque control schedule 80 provides for determining a measure of corrected engine torque $T_E{}^*$ for given measures of total inlet air pressure P from the inlet air pressure sensor 68 and—depending upon the operating mode 74—total inlet air temperature T from the inlet air temperature sensor 66, for a given operating mode input 70, i.e. power-level command, from the operating mode selector 72, wherein corrected engine torque $T_E{}^*$ is given by:

$$T_E^* = f(T_E, P) = \frac{T_E}{\delta} \qquad (1)$$

where $$\delta = f(P) = \frac{P}{P_{Std}} \qquad (2)$$

and $P_{Std}$ is the standard atmospheric pressure at sea level, e.g. 14.696 PSI. The schedule of corrected engine torque $T_E^*$ as a function of total inlet air pressure P, of the torque control schedule 80, is dependent upon the operating mode 74, and is also dependent upon a) the altitude 82 of the aircraft 14 above ground level (AGL), —for example, as inferred from a gear-down-and-locked sensor 83.1 of a landing gear sensor 83, or as directly measured by an above-ground-level-altitude sensor 84 on the aircraft 14, b) whether or not the aircraft 14 is operating on the ground 85, either determined from an associated weight-on-wheels sensor 83.2 or responsive to an explicit "Ground Idle" operating mode 74 from the operating mode selector 72, and c) for most operating modes 74, the total inlet air temperature T.

Figure 11:
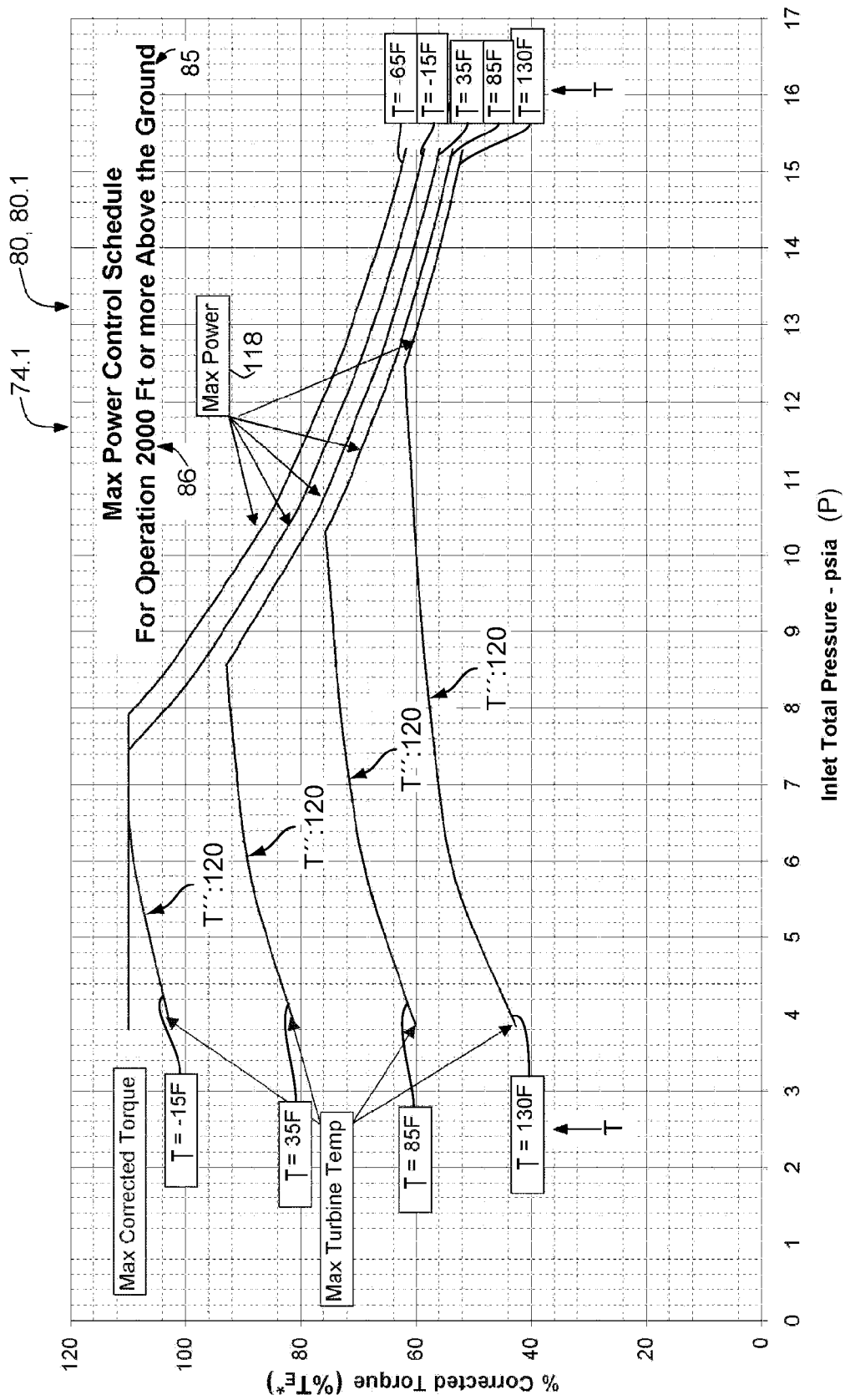
FIG. 11 illustrates a first control schedule for operation of the single-spool turboprop engine at maximum power with at least near-minimum $TSFC_c$ for each level of $F_{nc}$ at altitudes above a threshold above ground level (AGL), given from FIG. 10 by the plot of percent corrected engine torque as a function of total inlet air pressure for the family of lines with respect to different values of total inlet air temperature, but subject to a limitation on the associated maximum turbine inlet temperature.

For example, when the operating mode selector 72 is set to operate the single-spool turboprop engine 10 in the "Maximum Power" mode 74.1 with the aircraft 14 operated at an altitude 82 in excess of an associated AGL threshold altitude 86 AND with the landing gear up as detected by a FALSE gear-down-and-locked signal GDAL from a gear-down-and-locked sensor 83.1 of the landing gear sensor 83, then an associated first torque control schedule 80, 80.1 provides a level of corrected engine torque $T_E^*$ as a function of both total inlet air pressure P and total inlet air temperature T, for example, as illustrated in FIGS. 2a and 11 in the form of plots of corrected engine torque $T_E^*$ as a function of total inlet air pressure P for a family of values of associated total inlet air temperature T, wherein the process of developing the associated first torque control schedule 80, 80.1 illustrated in FIG. 11 for the "Maximum Power" mode 74.1 for altitudes 82 above the AGL threshold altitude 86 or with the landing gear up is described more fully hereinbelow. As one of ordinary skill in the art will understand, the set of reference characters 80, 80.1 herein and in FIG. 11 indicates that the first torque control schedule 80.1 is a particular type of a generic torque control schedule 80.

Figure 12:
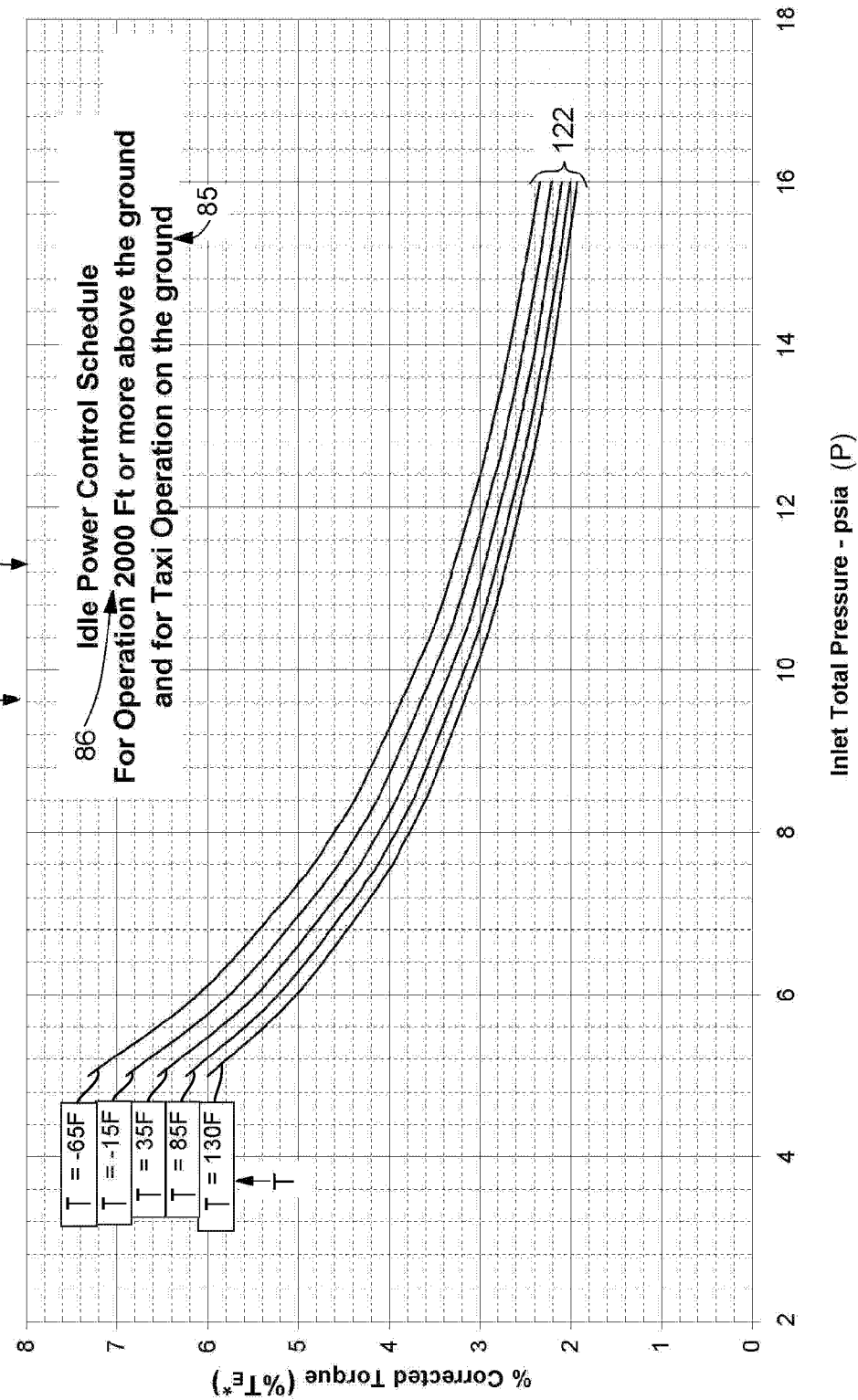
FIG. 12 illustrates a second control schedule for operation of the single-spool turboprop engine at an idle power level with at least near-minimum $TSFC_c$ for each level of $F_{nc}$ at altitudes above the threshold above ground level (AGL) and for operation on the ground, as given by a plot of percent corrected engine torque as a function of total inlet air pressure for a family of lines with respect to different values of total inlet air temperature, in accordance with both the control schedule illustrated in FIG. 8 and the associated relationship between percent corrected engine torque and percent corrected power illustrated in FIG. 9.

When the operating mode selector 72 is set to operate the single-spool turboprop engine 10 in the "Idle" mode 74.2 either with the aircraft 14 operated at an altitude 82 in excess of the associated AGL threshold altitude 86 AND with the landing gear up as detected by a FALSE gear-down-and-locked signal GDAL from the gear-down-and-locked sensor 83.1 of the landing gear sensor 83; OR if the aircraft 14 is operated on the ground 85 with persistent weight on wheels as detected by a TRUE weight-on-wheels signal WOW from a weight-on-wheels sensor 83.2 of the landing gear sensor 83, then an associated second torque control schedule 80, 80.2 provides a level of corrected engine torque $T_E^*$ as a function of both total inlet air pressure P and total inlet air temperature T, for example, as illustrated in FIG. 12 in the form of plots of corrected engine torque $T_E^*$ as a function of total inlet air pressure P for a family of values of associated total inlet air temperature T, wherein the process of developing the associated second torque control schedule 80, 80.2 illustrated in FIG. 12 for the "Idle" mode 74.2 for altitudes 82 above the AGL threshold altitude 86 or for operation on the ground 85 is described more fully hereinbelow. As one of ordinary skill in the art will understand, the set of reference characters 80, 80.2 herein and in FIG. 12 indicates that the second torque control schedule 80.2 is a particular type of a generic torque control schedule 80.

Figure 13:
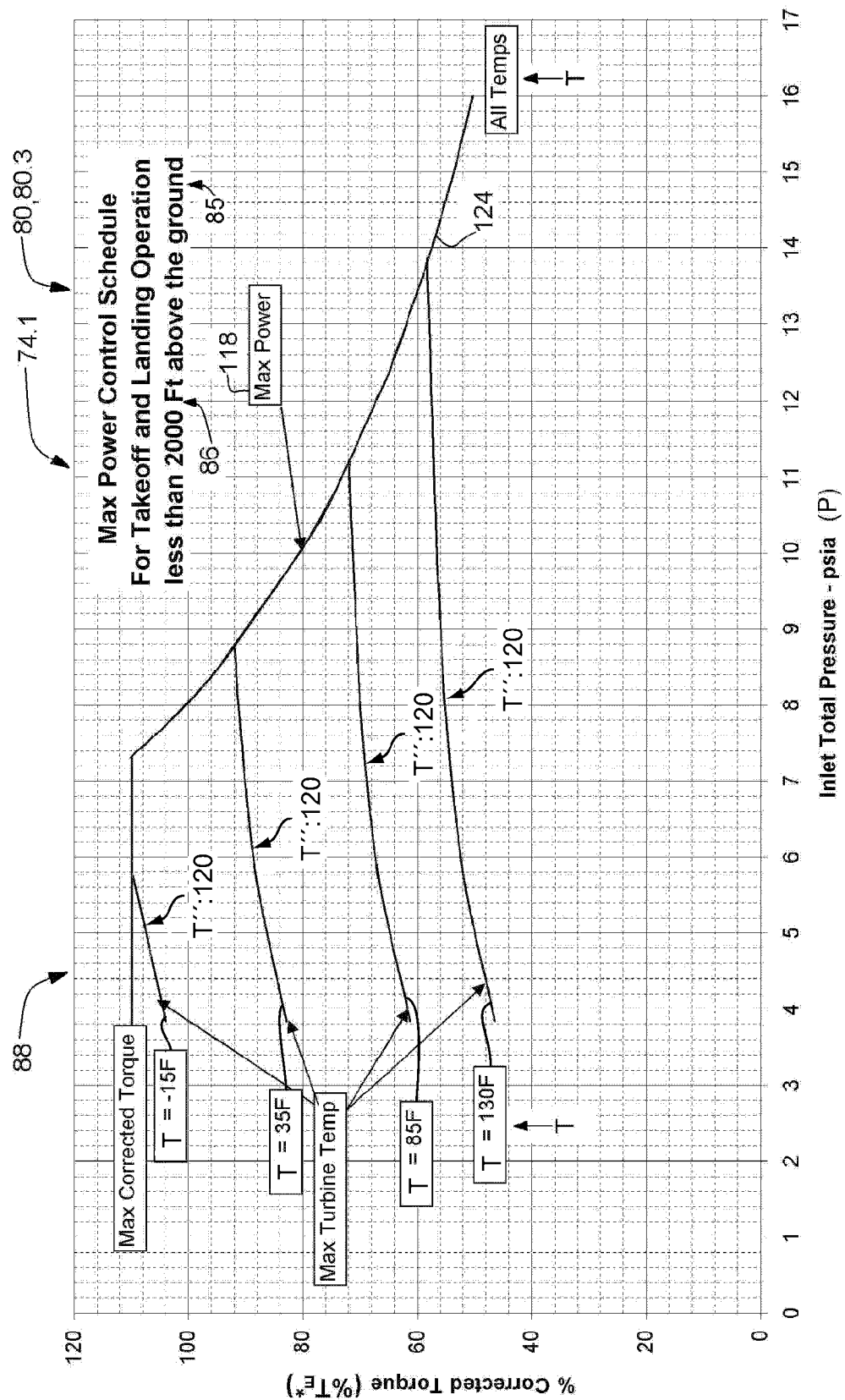
FIG. 13 illustrates a third control schedule for operation of the single-spool turboprop engine at maximum power and at takeoff engine speed at altitudes below the threshold above ground level (AGL) during takeoff and landing, as given by a plot of percent corrected engine torque as a function of total inlet air pressure for a family of lines with respect to different values of total inlet air temperature, subject to a limitation on the associated maximum turbine inlet temperature.

When the operating mode selector 72 is set to operate the single-spool turboprop engine 10 in the "Maximum Power" mode 74.1 with the aircraft 14 operated at an altitude 82 less than or equal to the associated AGL threshold altitude 86 OR with the landing gear down as detected by a TRUE gear-down-and-locked signal GDAL from the gear-down-and-locked sensor 83.1 of the landing gear sensor 83, then the single-spool turboprop engine 10 is operated at a takeoff rotational speed level 88 of rotational propeller speed $N_P$ that corresponds to the maximum value of rotational engine speed $N_E$ rated for takeoff conditions, and an associated third torque control schedule 80, 80.3 provides a level of corrected engine torque $T_E^*$ as a function of both total inlet air pressure P and total inlet air temperature T, for example, as illustrated in FIG. 13 in the form of plots of corrected engine torque $T_E^*$ as a function of total inlet air pressure P for a family of values of associated total inlet air temperature T, wherein the process of developing the associated third torque control schedule 80, 80.3 illustrated in FIG. 13 for the "Maximum Power" mode 74.1 for altitudes 82 below the AGL threshold altitude 86 or with the landing gear down is described more fully hereinbelow. As one of ordinary skill in the art will understand, the set of reference characters 80, 80.3 herein and in FIG. 13 indicates that the third torque control schedule 80.3 is a particular type of a generic torque control schedule 80.

Figure 14:
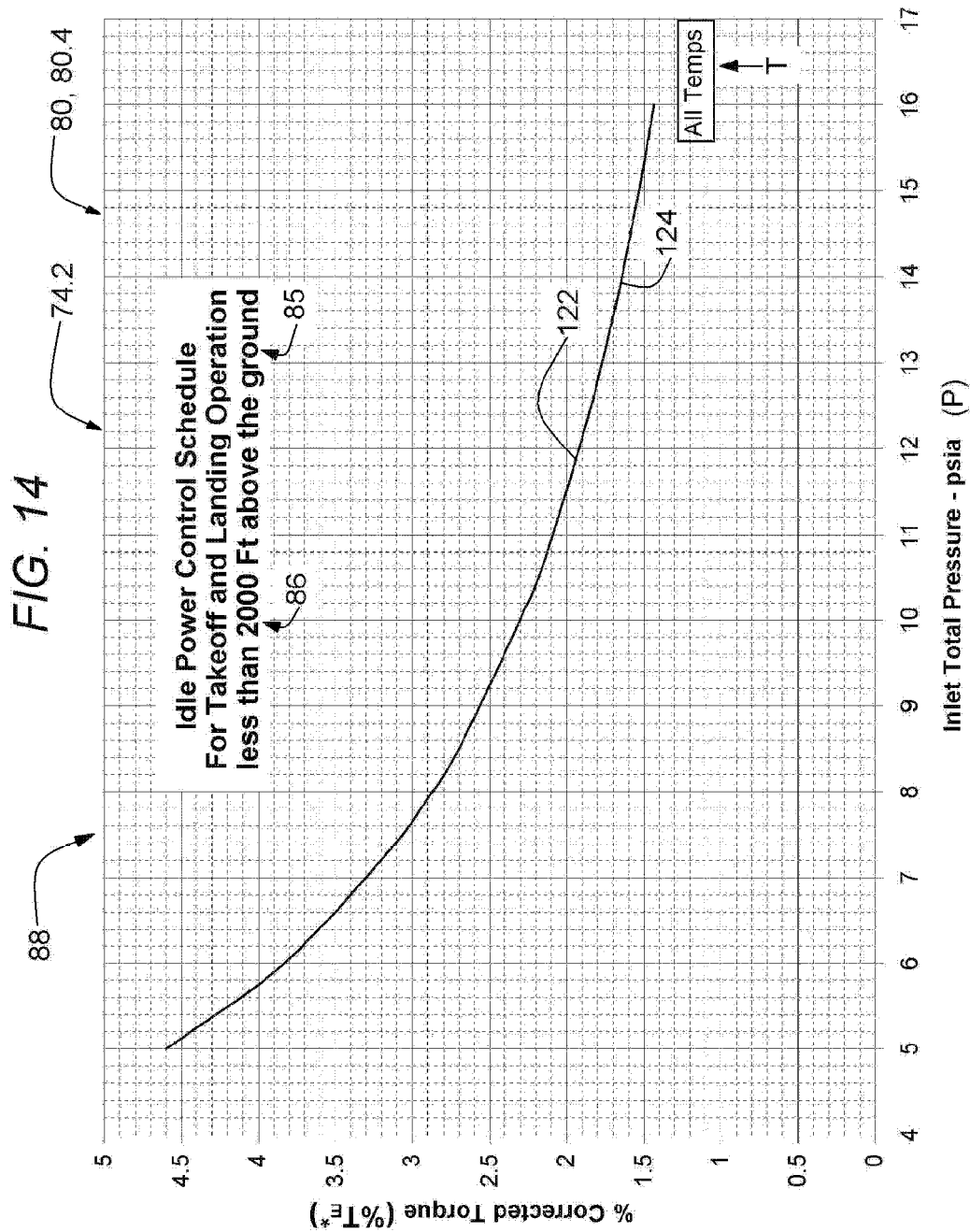
FIG. 14 illustrates a fourth control schedule for operation of the single-spool turboprop engine at an idle power level and at takeoff engine speed at altitudes below the threshold above ground level (AGL) during takeoff and landing, as given by a plot of percent corrected engine torque as a function of total inlet air pressure, independent of total inlet air temperature.

Finally, when the operating mode selector 72 is set to operate the single-spool turboprop engine 10 in the "Idle" mode 74.2 with the aircraft 14 operated above ground 85 at an altitude 82 less than or equal to the associated AGL threshold altitude 86 OR with the landing gear down as detected by a TRUE gear-down-and-locked signal GDAL from the gear-down-and-locked sensor 83.1 of the landing gear sensor 83, AND with the aircraft 14 operated without persistent weight on wheels as detected by a FALSE weight-on-wheels signal WOW from the weight-on-wheels sensor 83.2 of the landing gear sensor 83, i.e. with the aircraft 14 undergoing flight during either approach or landing, then the single-spool turboprop engine 10 is operated at the takeoff rotational speed level 88 of rotational propeller speed $N_P$ that corresponds to the maximum value of rotational engine speed $N_E$ rated for takeoff conditions, and an associated fourth torque control schedule 80, 80.4 provides a level of corrected engine torque $T_E^*$ as a function of total inlet air pressure P independent of total inlet air temperature T, for example, as illustrated in FIG. 14, wherein the process of developing the associated fourth torque control schedule 80, 80.4 illustrated in FIG. 14 for the "Idle" mode 74.2 for altitudes 82 below the AGL threshold altitude 86 or with the aircraft 14 undergoing flight with the landing gear down, is described more fully hereinbelow. As one of ordinary skill in the art will understand, the set of reference characters 80, 80.4 herein and in FIG. 14 indicates that the fourth torque control schedule 80.4 is a particular type of a generic torque control schedule 80.

The weight-on-wheels sensor 83.2 of the landing gear sensor 83 provides for indicating if there has been persistent weight on the wheels of the aircraft 14, so as to provide for distinguishing a ground taxiing operation from an intermittent touchdown during a landing operation. For example, in one embodiment, the weight-on-wheels signal WOW would be set to TRUE if there has been persistent weight on the wheels of the aircraft 14 for a period of time in excess of a threshold, and the weight-on-wheels signal WOW would be immediately reset to FALSE when there is no weight on the wheels of the aircraft 14. Accordingly, referring again to FIG.

2a, the corrected engine torque $T_E^*$ is first given in step (302) as a function of total inlet air pressure P and total inlet air temperature T from one of the first through fourth torque control schedules 80, 80.1, 80.2, 80.3, 80.4 depending upon the selected operating mode 74 and associated operation condition of the aircraft 14, when the operating mode selector 72 set to either the corresponding "Maximum Power" mode 74.1 or "Idle" mode 74.2. When the operating mode selector 72 is set to provide for an intermediate level of power, then the torque control schedule 80 is interpolated between the first 80.1 and second 80.2 torque control schedules if either the aircraft 14 is in flight above the AGL threshold altitude 86 AND the landing gear is up, OR if the aircraft 14 is operating on the ground; and otherwise the torque control schedule 80 is interpolated between the third 80.3 and fourth 80.4 torque control schedules.

Then, in step (304), if the altitude 82 of the aircraft 14 above ground 85, i.e. above ground level (AGL), is less than or equal to the corresponding AGL threshold altitude 86, OR if the gear-down-and-locked signal GDAL is TRUE then a first condition is satisfied; AND if the weight-on-wheels signal WOW is FALSE, indicating that the aircraft 14 is in flight during either takeoff, approach or landing OR if the operating mode selector 72 is set to operate the single-spool turboprop engine 10 in the "Maximum Power" mode 74.1, then a second condition is satisfied. If both the first and second conditions are satisfied, then the rotational propeller speed $N_P$ of the variable pitch propeller assembly 54 is set to the takeoff rotational speed level 88 so as to provide for maximum responsiveness of the gas turbine engine 22 to requested changes of operating power by changes in operating mode 74 by the pilot. For example, while under approach to landing while operating in the "Idle" mode 74.2, if the pilot should need to abort the landing, then with the gas turbine engine 22 operating at the associated takeoff rotational speed, the corrected engine torque $T_E^*$ can quickly be changed to a corresponding takeoff level by simply changing the amount of fuel 40 injected into the associated combustion chamber 38, without otherwise being subject to a delay during acceleration of the gas turbine engine 22 if otherwise operated at a rotational engine speed $N_E$ less than the associated takeoff rotational speed. The activation of the weight-on-wheels signal WOW would be delayed either by a fixed delay period, or until such time as there has been weight on wheels continuously for a given sufficient delay period, so as to prevent activation of the weight-on-wheels signal WOW in the event of a touch-and-go landing situation, and would be immediately reset to a FALSE condition when the weight is no longer on the wheels. Referring also to FIG. 1, in one embodiment, an above-ground-level-altitude sensor 84 incorporated in the aircraft 14 provides for measuring or determining the altitude 82 of the aircraft 14 above ground 85. For example, the above-ground-level-altitude sensor 84 could comprise either a radar or LIDAR sensor to provide for directly measuring the altitude 82 above ground 85. Alternatively, the above-ground-level-altitude sensor 84 could determine the altitude 82 above ground 85 indirectly, for example, from a direct measure of aircraft altitude using either an altimeter or a GPS navigation system 92 in combination with a map database 94 that provides a measure of the elevation of the ground 85 under the aircraft 14, wherein the altitude 82 above ground 85 would then be given from the difference of the absolute altitude from the altimeter or GPS navigation system 92 and the elevation of the ground from the map database 94, at the location of the aircraft 14 from the GPS navigation system 92 as projected onto the ground 85. For example, in one embodiment, the AGL threshold altitude 86 is about 2000 feet.

Returning to FIG. 2a, if the altitude 82 of the aircraft 14 above ground 85 is above the AGL threshold altitude 86, or if the gear-down-and-locked signal GDAL is FALSE for an aircraft 14 incorporating a gear-down-and-locked sensor 83.1, then the corrected rotational engine speed $N_E^*$ is determined in step (306) from a speed control schedule 96 responsive to the corrected engine torque $T_E^*$ from the torque control schedule 80, 80.1, 80.2, and possibly also responsive to the airspeed 98 of the aircraft 14. The speed control schedule 96 provides for corrected engine torque $T_E^*$ as a function of corrected rotational engine speed $N_E^*$ so as to nominally minimize the associated corrected thrust specific fuel consumption ($TSFC_c$) of the gas turbine engine 22, for example, as given by FIG. 8 which is described more fully hereinbelow. Alternatively, some other measure of fuel consumption could be nominally minimized, for example, brake specific fuel consumption (BSFC). Accordingly, in step (306), for a given value of corrected engine torque $T_E^*$, the speed control schedule 96 provides a corresponding value of corrected rotational engine speed $N_E^*$ so as to provide for nominally minimum associated corrected thrust specific fuel consumption ($TSFC_c$).

Equivalently, the speed control schedule 96 provides for corrected engine torque $T_E^*$ as a function of corrected rotational engine speed $N_E^*$, or $$T_E^* = f(N_E^*) \tag{3}$$

that provides for nominally minimum corrected thrust specific fuel consumption ($TSFC_c$), so that in step (306), that function is inverted using the corrected engine torque $T_E^*$ from the torque control schedule 80, 80.1, 80.2 in step (302) to give the corresponding corrected rotational engine speed $N_E^*$ that provides for nominally minimum corrected thrust specific fuel consumption ($TSFC_c$), or $$N_E^* = f^{-1}(T_E^*) \tag{4}$$

The corrected rotational engine speed $N_E^*$ is given by:

$$N_E^* = f(N_E, T) = \frac{N_E}{\sqrt{\theta}} \tag{5}$$

where $$\theta = f(T) = \frac{T}{T_{Std}} \tag{6}$$

and $T_{Std}$ is the standard atmospheric temperature at sea level, e.g. 518.67 degrees Rankine.

The corrected thrust specific fuel consumption ($TSFC_c$) is given by:

$$TSFC_c = \frac{W_{Fc}}{F_{nc}} \tag{7}$$

wherein $W_{Fc}$ is the corrected mass fuel flow rate and $F_{nc}$ is the corrected net force ($F_{nc}$), which are respectively given by:

$$W_{Fc} = \frac{W_F}{\delta \cdot \theta^{0.68}}, \text{ and} \tag{8a}$$

$$F_{nc} = f(F, P) = \frac{F}{\delta}, \tag{8b}$$

wherein $W_F$ is the mass fuel flow rate.

In accordance with the first aspect of the single-spool turboprop engine control system 200, 200.1, the corrected engine torque $T_E^*$ from the torque control schedule 80, 80.1, 80.2, 80.3, 80.4 is then used as a corresponding corrected torque command to control the engine torque $T_E$ of the gas turbine engine 22 by controlling the flow of fuel 40 with a first aspect of a torque control loop 202, 202.1 to regulate both engine torque $T_E$ and associated propeller torque $T_P$ to a level corresponding to the corrected torque command. Also, the corrected rotational engine speed $N_E^*$ from the speed control schedule 96 is used as a corresponding corrected rotational speed command to control the rotational engine speed $N_E$ of the gas turbine engine 22 by controlling the propeller blade pitch α of the variable pitch propeller assembly 54 with a first aspect of a speed control loop 204, 204.1 to regulate both rotational propeller speed $N_P$ and associated rotational engine speed $N_E$ to a level corresponding to the corrected rotational speed command. As one of ordinary skill in the art will understand, the set of reference characters 202, 202.1 herein and in FIG. 2b indicates that the first aspect 202.1 is a particular species of a generic torque control loop 202, and the set of reference characters 204, 204.1 herein and in FIG. 2b indicates that the first aspect 204.1 is a particular species of a generic speed control loop 204.

Figure 8:
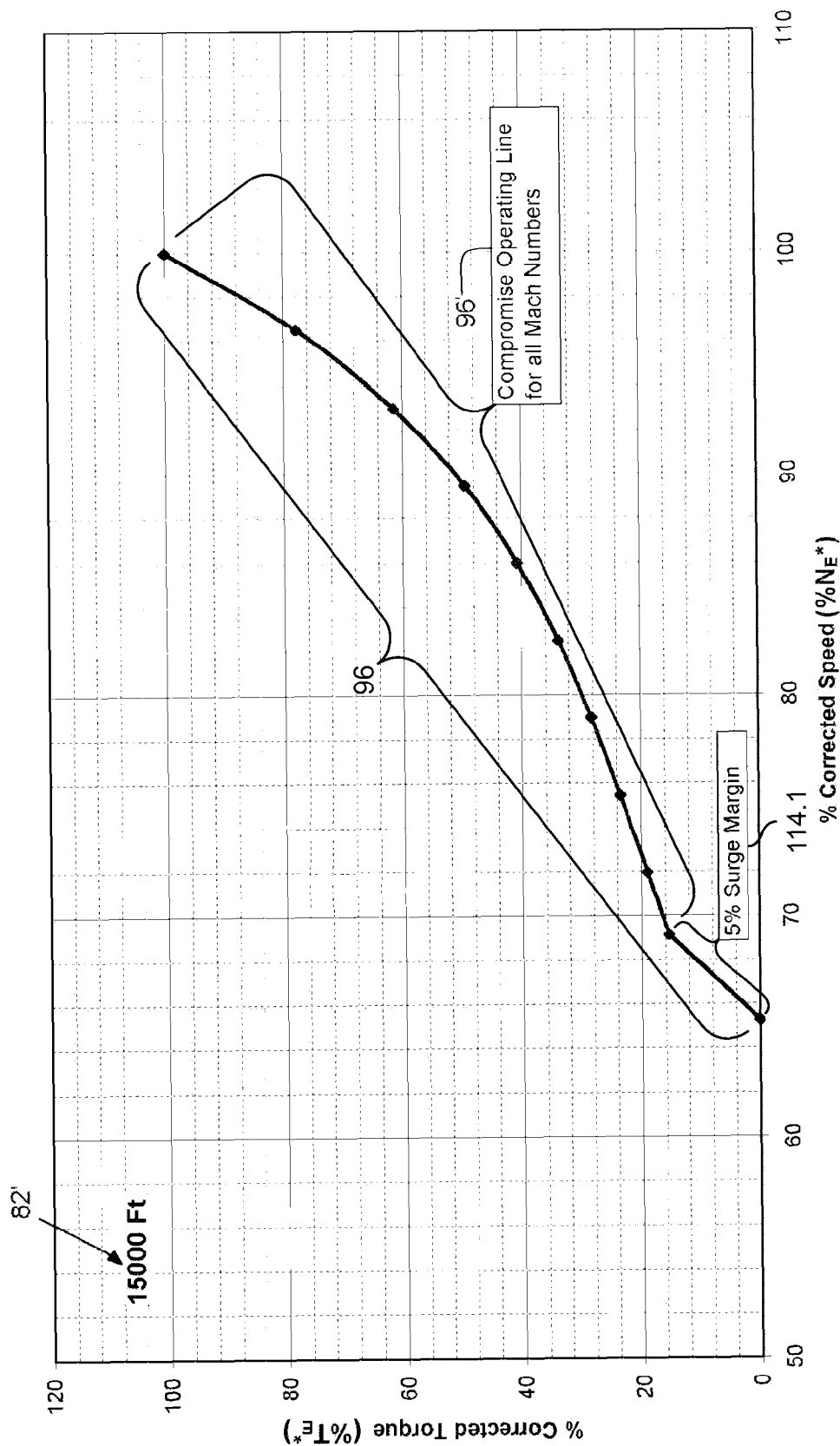
FIG. 8 illustrates a control schedule for operation of the single-spool turboprop engine with at least near-minimum $TSFC_c$ for each level of $F_{nc}$ at an altitude of 15,000 feet independent of Mach number, given from FIG. 7 as a plot of the compromise schedule of percent corrected engine torque as a function of percent corrected engine rotational speed for the at least near-minimum associated $TSFC_c$ for each level of $F_{nc}$ independent of Mach number, limited to no less than a 5 percent compressor surge margin.

Accordingly, when the aircraft 14 is in flight at an altitude 82 above ground 85 that is greater than the AGL threshold altitude 86 and with the landing gear up, or when the aircraft 14 is operating on the ground 85 at less than maximum power, then the rotational propeller speed $N_P$ of the variable pitch propeller assembly 54 is set in accordance with the speed control schedule 96 from step (306)—for example, from FIG. 8—so as to provide for substantially optimal corrected thrust specific fuel consumption ($TSFC_c$), whereas when the aircraft 14 is in flight at an altitude 82 above ground 85 that is less than or equal to the AGL threshold altitude 86—i.e. near the ground—or with the landing gear down, or when the gas turbine engine 22 is operated at maximum power with the aircraft 14 on the ground 85—for example, during takeoff or landing operation—then the rotational propeller speed $N_P$ of the variable pitch propeller assembly 54 is set to the takeoff rotational speed level 88 so as to provide for maximum responsiveness of the gas turbine engine 22.

In an alternative embodiment, a landing gear sensor 83 incorporated in the aircraft 14 provides for detecting one or more conditions of the landing gear that can be used to determine either whether the aircraft 14 is operating on the ground 85, or whether the aircraft 14 is in flight during either takeoff, approach or landing, depending upon the type of landing gear and the nature of the landing gear sensor 83.

For example, for an aircraft 14 with retractable landing gear, in one embodiment, a gear-down-and-locked sensor 83.1 provides a binary gear-down-and-locked signal GDAL that when TRUE, indicates that the landing gear is extended down and locked in position, and when FALSE, indicates that the landing gear is retracted or undergoing retraction. Under typical operating conditions, the retractable landing gear would be extended down prior to approach to landing at an altitude 82 above ground 85 corresponding to the above AGL threshold altitude 86. Accordingly, the gear-down-and-locked signal GDAL would be TRUE when the altitude 82 of the aircraft 14 is at or below the AGL threshold altitude 86, so the gear-down-and-locked signal GDAL can be used to indicate that the altitude 82 of the aircraft 14 is at or below the AGL threshold altitude 86, so as to provide for automatically setting the operating mode of the single-spool turboprop engine 10 at either a torque-responsive corrected rotational engine speed $N_E^*$ in accordance with the first 80.1 or second 80.2 torque control schedules when the gear-down-and-locked signal GDAL is FALSE; or at a fixed rotational engine speed $N_E$ corresponding to the takeoff rotational speed level 88 of rotational propeller speed $N_P$ in accordance with the third 80.3 or fourth 80.4 torque control schedules when the gear-down-and-locked signal GDAL is TRUE and the aircraft 14 is in flight.

Accordingly, in an alternative embodiment, either the above-ground-level-altitude sensor 84 or the gear-down-and-locked sensor 83.1 could be used individually, without the other, to provide for automatically selecting the appropriate torque control schedule 80. Alternatively, a separately activated switch could be used instead of either the above-ground-level-altitude sensor 84 or the gear-down-and-locked sensor 83.1 to provide for indicating when the aircraft 14 is in flight in proximity to the ground 85 so as to provide for selecting either the third 80.3 or fourth 80.4 torque control schedules—or an interpolation therebetween for intermediate thrust lever angles TLA—and for operating at a fixed rotational engine speed $N_E$ corresponding to the takeoff rotational speed level 88 of rotational propeller speed $N_P$.

Furthermore, for an aircraft 14 without a weight-on-wheels sensor 83.2 to provide a weight-on-wheels signal WOW indicating whether or not the aircraft 14 is operating on the ground 85, the operating mode selector 72 may be provided with separate "Ground Idle" and "Flight Idle" positions or detents so as to provide for manually switching between the second 80.2 and fourth 80.4 torque schedules, and for manually selecting the corrected rotational engine speed $N_E^*$ from either the speed control schedule 96 or the fixed rotational engine speed $N_E$ corresponding to the takeoff rotational speed level 88 of rotational propeller speed $N_P$. For example, in the "Ground Idle" mode, the second torque control schedule 80, 80.2 would be used to provide the corresponding corrected torque command, and the speed control schedule 96 would be used to provide the corresponding corrected rotational speed command; whereas in the "Flight Idle" mode, the fourth torque control schedule 80, 80.4 would be used to provide the corresponding corrected torque command and the corrected rotational speed command would correspond to the takeoff rotational speed level 88 of rotational propeller speed $N_P$.

For an aircraft 14 incorporating a continuously adjustable thrust lever 72', at relatively lower thrust lever angles TLA in flight associated with approach to landing, and at the "Maximum Power" thrust lever angle TLA associated with takeoff, the single-spool turboprop engine 10 is operated at a fixed rotational engine speed $N_E$ corresponding to the takeoff rotational speed level 88 of rotational propeller speed $N_P$ in accordance with a torque control schedule 80 given by interpolating the third 80.3 or fourth 80.4 torque control schedules. At "Maximum Continuous Power" or "Cruise" thrust lever angles TLA associated with climb or cruise, the single-spool turboprop engine 10 is operated at a torque-responsive corrected rotational engine speed $N_E^*$ in accordance with a torque control schedule 80 given by interpolating the first 80.1 or second 80.2 torque control schedules. When the weight-on-wheels signal WOW is TRUE, associated with operation of the aircraft 14 on the ground 85, the single-spool turboprop engine 10 is automatically operated at a torque-responsive corrected rotational engine speed $N_E^*$ in accordance with the second torque control schedule 80, 80.2 as the torque control schedule 80, with a corresponding relatively low rotational propeller speed $N_P$, so as to reduce or minimize noise.

In accordance with the first aspect of the single-spool turboprop engine control system 200, 200.1 in cooperation with an associated first aspect of an associated control algorithm 300, 300.1, the associated torque control loop 202, 202.1 is used to regulate on either engine torque $T_E$ or propeller torque $T_P$, depending upon the source of torque feedback, to control the flow of fuel 40 to the gas turbine engine 22 so that a measured or estimated value of torque is regulated to a level corresponding to the corrected engine torque $T_E^*$ from the corresponding torque control schedule 80, 80.1, 80.2, 80.3, 80.4. As one of ordinary skill in the art will understand, the set of reference characters 300, 300.1 herein and in FIGS. 2a and 2b indicates that the first aspect 300.1 is a particular species of a generic control algorithm 300.

Referring to FIGS. 2b, 1 and 2a, in accordance with an example of the first aspect of the single-spool turboprop engine control system 200, 200.1, the torque control loop 202, 202.1 is illustrated with examples of three different prospective sources of associated measured or estimated values of torque, including 1) measured propeller torque $T_P^M$ from a propeller torque sensor 100; 2) a first estimated propeller torque $T_P^{E1}$ from a first propeller torque estimator 102 based upon measurements or estimates of a) measured rotational propeller speed $N_P^M$ from an associated propeller rotational speed sensor 104, b) propeller blade pitch α from the propeller blade pitch control system 60, c) total inlet air pressure P, d) total inlet air temperature T and e) airspeed 98 from an airspeed sensor 106; and 3) a second estimated propeller torque $T_P^{E2}$ from a second propeller torque estimator 108 based upon measurements or estimates of a) engine inter-turbine temperature T' from an associated engine inter-turbine temperature sensor 110, b) total inlet air pressure P, c) total inlet air temperature T, and d) either measured rotational propeller speed $N_P^M$ from the associated propeller rotational speed sensor 104 or rotational engine speed $N_E$ inferred therefrom, wherein the measured propeller torque $T_P^M$ is normally used as the primary measure of propeller torque $T_P$ in the torque control loop 202, 202.1, and the first $T_P^{E2}$ and second $T_P^{E2}$ estimated propeller torque measures are normally used as secondary measures of propeller torque $T_P$ for fault detection and fault tolerance. Accordingly, the associated torque control loop 202, 202.1 provides for controlling the flow of fuel 40 to the gas turbine engine 22 so that the measured or estimated level of propeller torque $T_P^{ME}$, —i.e. primarily the measured propeller torque $T_P^M$, but alternatively the first estimated propeller torque $T_P^{E1}$, or the second estimated propeller torque $T_P^{E2}$, or a combination thereof, if the measured propeller torque $T_P^M$ is erroneous, —is regulated to a level corresponding to a propeller torque reference $T_P^R$—also referred to herein as a propeller torque command, —wherein, in step (308), the propeller torque reference $T_P^R$ is derived from the corrected engine torque $T_E^*$ given from the associated particular torque control schedule 80, 80.1, 80.2, 80.3, 80.4, as follows:

$$T_P^R = T_E^* \cdot \delta \cdot GR \tag{9}$$

Accordingly, in step (310), the measured or estimated level of propeller torque $T_P^{ME}$ is subtracted from the propeller torque reference $T_P^R$ to provide a resulting propeller torque error $e_{PT}$ as follows:

$$e_{PT} = T_P^R - T_P^{ME} \tag{10}$$

which, in step (312), is input to a fuel control law 206 that determines and communicates an associated fuel control command (e.g. Δ Fuel) to an associated fuel controller 112 of the fuel control system 44, which in turn controls the flow of fuel 40 from the fuel supply 46 to the fuel injector 42 for injection into the combustion chamber 38 of the gas turbine engine 22 so as to null the propeller torque error $e_{PT}$ and thereby regulate the resulting propeller torque $T_P$ to the level of the associated propeller torque reference $T_P^R$.

Although the torque control loop 202, 202.1 primarily controls propeller torque $T_P$ responsive to feedback of the measured propeller torque $T_P^M$, alternatively, each of the group: the measured propeller torque $T_P^M$, the first estimated propeller torque $T_P^M$, and the second estimated propeller torque $T_P^{E2}$ may be measured or determined in parallel, and then, in step (314), one of the group may be selected therefrom according to a voting scheme 208. For example, if a level of one of the group was substantially different from the others, either one of the remaining members of the group could be used for the measured or estimated level of propeller torque $T_P^{ME}$ according to a selection priority, or an average or weighted average of the remaining members of the group could be used to determine the measured or estimated level of propeller torque $T_P^{ME}$. Otherwise, if none of the levels were substantially different from one another, then the measured propeller torque $T_P^M$ would be used for the measured or estimated level of propeller torque $T_P^{ME}$ as a measure of propeller torque $T_P$ so as to provide for feedback control thereof by the torque control loop 202, 202.1.

Alternatively, the torque control loop 202, 202.1 could be adapted to use measured or estimated levels of engine torque $T_E^{ME}$ that in step (310) would be subtracted from a corresponding engine torque reference $T_E^R$ given by:

$$T_E^R = T_E^* \cdot \delta \tag{11}$$

In accordance with the first aspect of the single-spool turboprop engine control system 200, 200.1, the associated speed control loop 204, 204.1 regulates rotational propeller speed $N_P$ by controlling the propeller blade pitch α of the variable pitch propeller assembly 54, wherein, when the aircraft 14 is operated at an altitude 82 in excess of the AGL threshold altitude 86, or, with the landing gear up, in step (316), the rotational propeller speed reference $N_P^R$ is given from corrected rotational engine speed $N_E^*$ from the speed control schedule 96 as follows:

$$N_P^R = \frac{N_E^* \cdot \sqrt{\theta}}{GR} \tag{12}$$

Otherwise, from step (304), if the aircraft 14 is both a) either in flight at an altitude 82 at or below the AGL threshold altitude 86 OR with the landing gear down, AND b) either operating without weight on wheels—e.g. in flight—OR operating in the "Maximum Power" mode 74.1, then the rotational propeller speed reference $N_P^R$ is set to the takeoff rotational speed level 88.

In one embodiment, this rotational propeller speed reference $N_P^R$ is used to control an actuator that in turn controls a spring-loaded bias force within a mechanical flyball-style governor 60.1' that is used to control the rotational propeller speed $N_P$.

Figure 9:
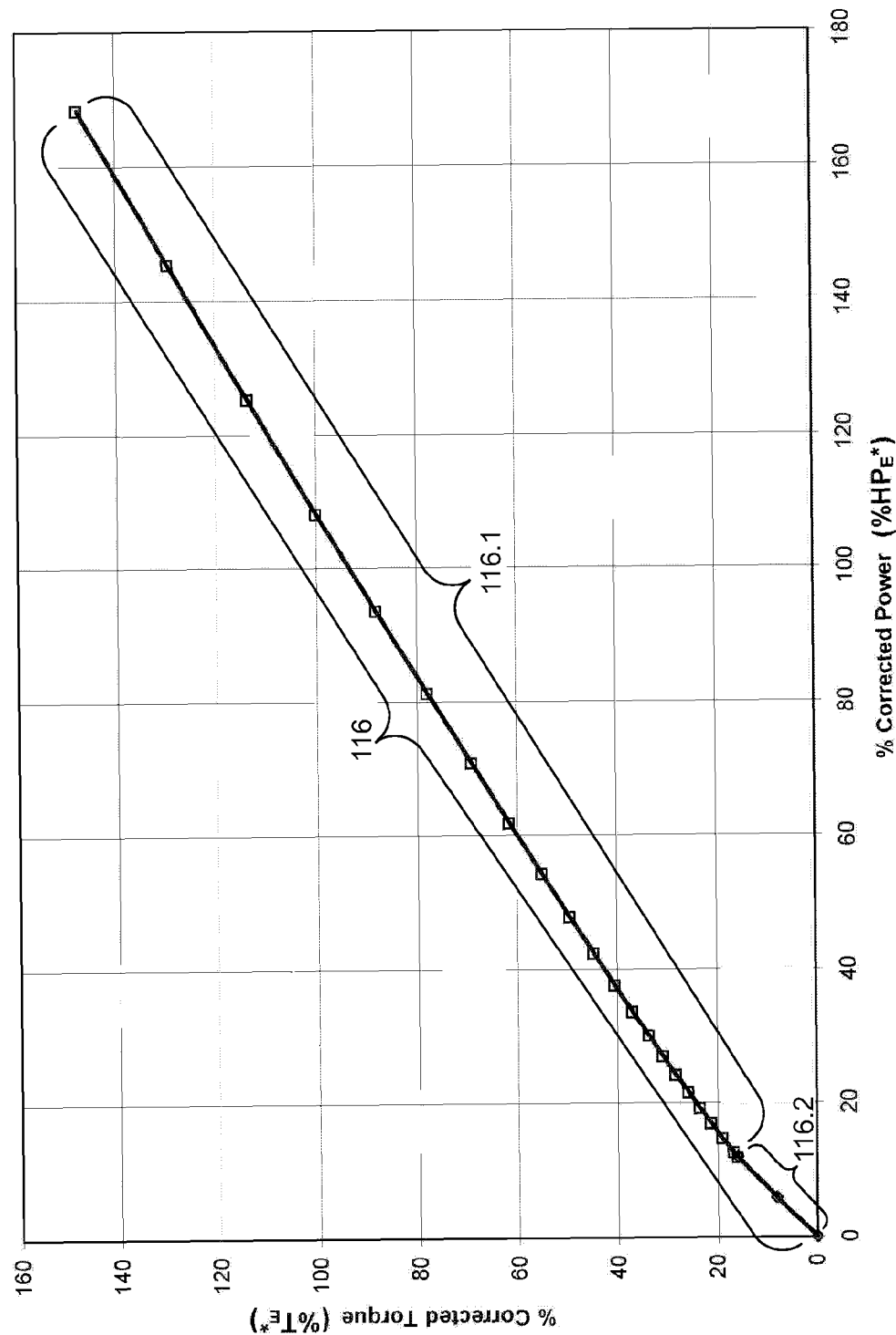
FIG. 9 illustrates a plot of percent corrected engine torque as a function of percent corrected power, based upon the control schedule illustrated in FIG. 8.
Figure 10:
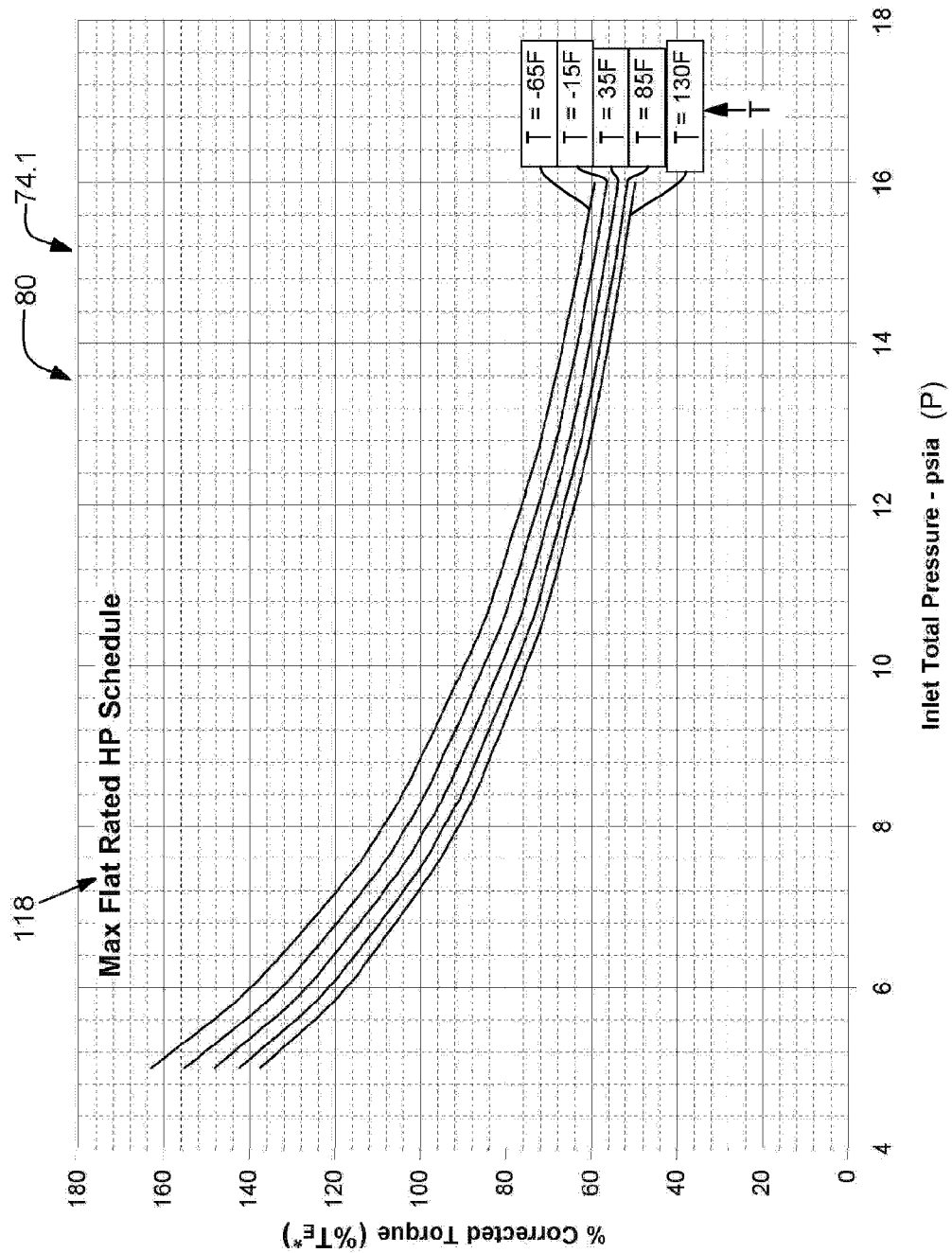
FIG. 10 illustrates a plot of percent corrected engine torque as a function of total inlet air pressure for a family of lines with respect to different values of total inlet air temperature for the single-spool turboprop engine operating at an upper bound power level in accordance with both the control schedule illustrated in FIG. 8 and the associated relationship between percent corrected engine torque and percent corrected power illustrated in FIG. 9.

Referring to FIGS. 3-14, in accordance with one aspect of a method for determining the torque 80 and speed 96 control schedules, the speed control schedule 96 illustrated in FIG. 8 is first determined as a result of a process illustrated by FIGS. 3-7, and then the first 80.1 and second 80.2 torque control schedules illustrated in FIGS. 11 and 12, respectively, are determined as a result of a process illustrated by FIGS. 9 and 10 and a subsequent modification as necessary to limit the level of associated turbine inlet temperature T". The third 80.3 and fourth 80.4 torque control schedules illustrated in FIGS. 13 and 14 are separately determined so as to provide for a fixed level of power at the maximum value of rotational engine speed $N_E$ rated for takeoff conditions that provides for the corresponding takeoff rotational speed level 88 of rotational propeller speed $N_P$.

Figure 3:
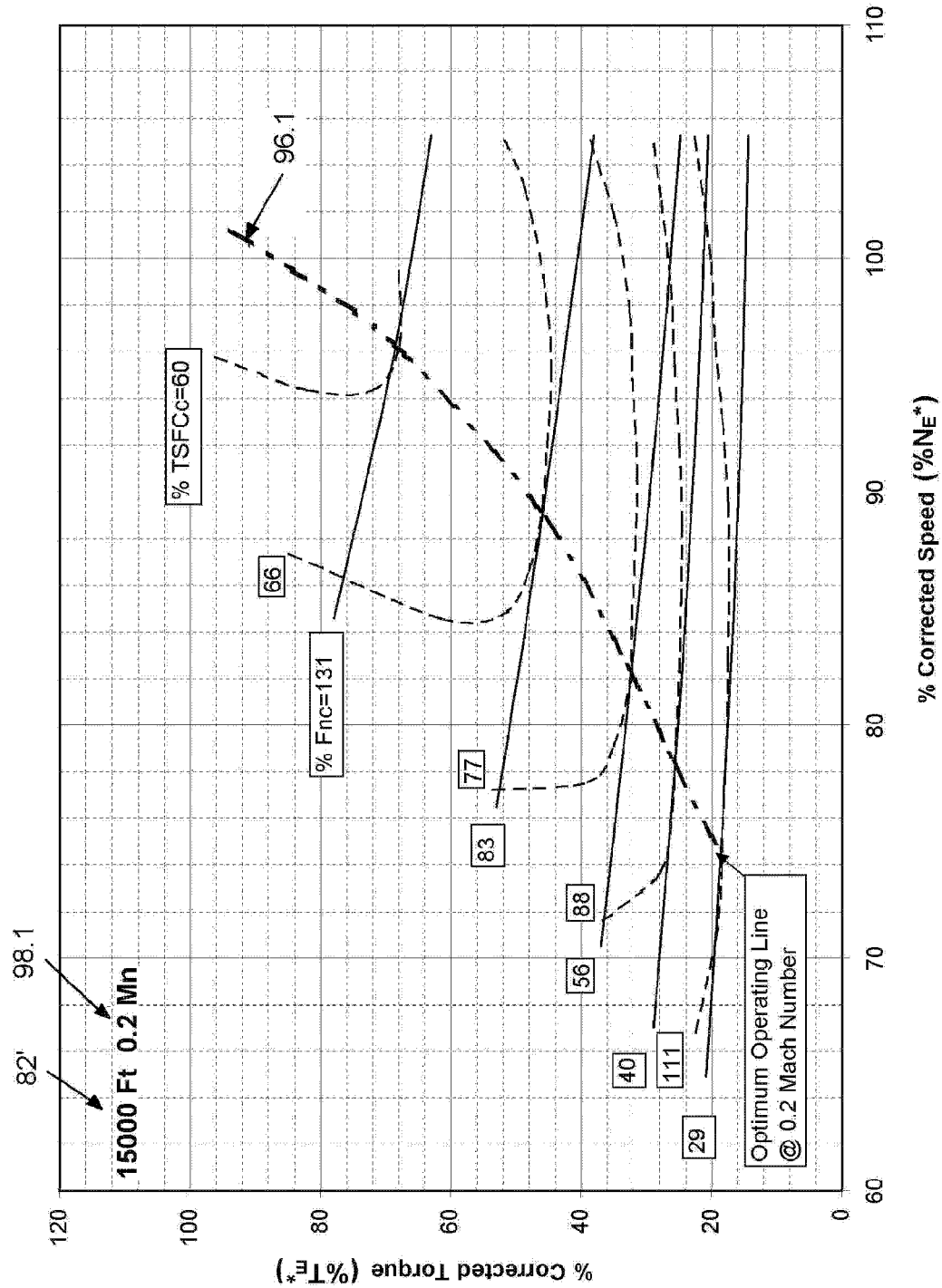
FIG. 3 illustrates a plot of percent corrected engine torque as a function of percent corrected engine rotational speed for a first family of lines with respect to different percent corrected net force values ($F_{nc}$), an associated second family of lines with respect to different associated percent corrected thrust specific fuel consumption ($TSFC_c$) values, and a corresponding plot of percent corrected engine torque as a function of percent corrected engine rotational speed for minimum associated $TSFC_c$ for each level of percent $F_{nc}$, for operation of a single-spool turboprop engine at an altitude of 15,000 feet at a speed of Mach 0.2.

More particularly, referring to FIG. 3, for the gas turbine engine 22 operating at a typical cruising altitude 82', for example 15,000 feet, and at a first airspeed 98.1, for example, Mach (Mn) 0.2, a first speed control schedule 96.1 of corrected engine torque $T_E^*$ as a function of corrected rotational engine speed $N_E^*$ is given by the locus of points for which lines of constant corrected thrust specific fuel consumption (TSFC$_c$) are tangent to lines of constant corrected net force ($F_{nc}$) under the given operating condition, so that for a given level of corrected net force ($F_{nc}$), the corresponding associated point in the first speed control schedule 96.1 is the combination of corrected rotational engine speed $N_E^*$ and corrected engine torque $T_E^*$ that provides for minimum corrected thrust specific fuel consumption (TSFC$_c$), and so that the locus of points of the first speed control schedule 96.1 correspond to distinct combinations of corrected rotational engine speed $N_E^*$ and corrected engine torque $T_E^*$ that provide for an associated corrected net force ($F_{nc}$) with minimum corrected thrust specific fuel consumption (TSFC$_c$).

Figure 4:
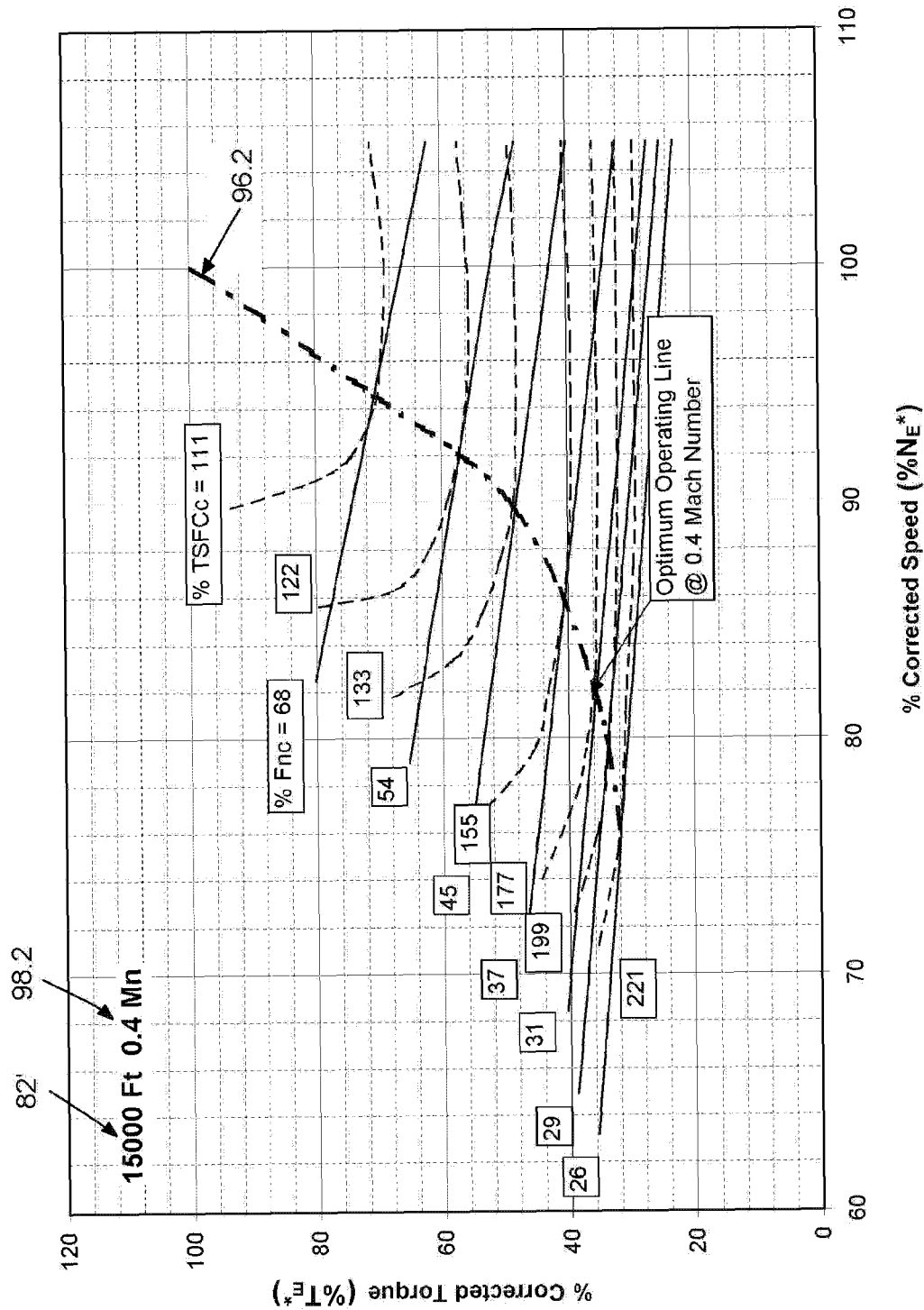
FIG. 4 illustrates a plot of percent corrected engine torque as a function of percent corrected engine rotational speed for a first family of lines with respect to different percent corrected net force values ($F_{nc}$), an associated second family of lines with respect to different associated percent corrected thrust specific fuel consumption ($TSFC_c$) values, and a corresponding plot of percent corrected engine torque as a function of percent corrected engine rotational speed for minimum associated $TSFC_c$ for each level of $F_{nc}$, for operation of the single-spool turboprop engine at an altitude of 15,000 feet at a speed of Mach 0.4.

Similarly, referring to FIG. 4, for the gas turbine engine 22 operating at the typical cruising altitude 82', for example 15,000 feet, and at a second airspeed 98.2, for example, Mach 0.4, a second speed control schedule 96.2 of corrected engine torque $T_E^*$ as a function of corrected rotational engine speed $N_E^*$ is given by the locus of points for which lines of constant corrected thrust specific fuel consumption (TSFC$_c$) are tangent to lines of constant corrected net force ($F_{nc}$) under the given operating condition, so that for a given level of corrected net force ($F_{nc}$), the corresponding associated point in the second speed control schedule 96.2 is the combination of corrected rotational engine speed $N_E^*$ and corrected engine torque $T_E^*$ that provides for minimum corrected thrust specific fuel consumption (TSFC$_c$), and so that the locus of points of the second speed control schedule 96.2 correspond to distinct combinations of corrected rotational engine speed $N_E^*$ and corrected engine torque $T_E^*$ that provide for an associated corrected net force ($F_{nc}$) with minimum corrected thrust specific fuel consumption (TSFC$_c$).

For example, the data necessary to determine the first 96.1 and second 96.2 speed control schedules, and any additional speed control schedules 96 for other associated altitudes 82 or airspeeds 98, may be obtained either by mathematically modeling the operation of the single-spool turboprop engine 10 in cooperation with the aircraft 14, including the characteristics of the compressor 18 and turbine 20 of the associated gas turbine engine 22, for example, including representations of actual compressor and turbine performance maps in order to provide for both estimating corrected engine torque $T_E^*$ and assessing the surge margin of the compressor 18, or by using corresponding measured data, or from a combination of the two, for example, a combination of measured torque, jet thrust and possibly net force of the associated gas turbine engine 22 or single-spool turboprop engine 10, with or without the associated gearbox 52 and variable pitch propeller assembly 54, from dynamometer tests of the gas turbine engine 22 or single-spool turboprop engine 10, together with a simulation of those aspects not otherwise measured.

If the powerplant controller 78 were adapted to receive an input of airspeed 98 from the associated airspeed sensor 106 of the aircraft 14, then the first 96.1 and second 96.2 speed control schedules, either solely by themselves or in combination with additional speed control schedules 96 for other associated airspeeds 82, could be used by the powerplant controller 78 either directly with interpolation with respect to airspeed 98, for example, in tabular form for interpolation with respect to each of the associated variables, or in the form of a mathematical model derived therefrom of corrected engine torque $T_E^*$ as a function of both corrected rotational engine speed $N_E^*$ and airspeed 98, so as to provide a measure of corrected rotational engine speed $N_E^*$ for an associated given corrected engine torque $T_E^*$ and airspeed 98.

Figure 5:
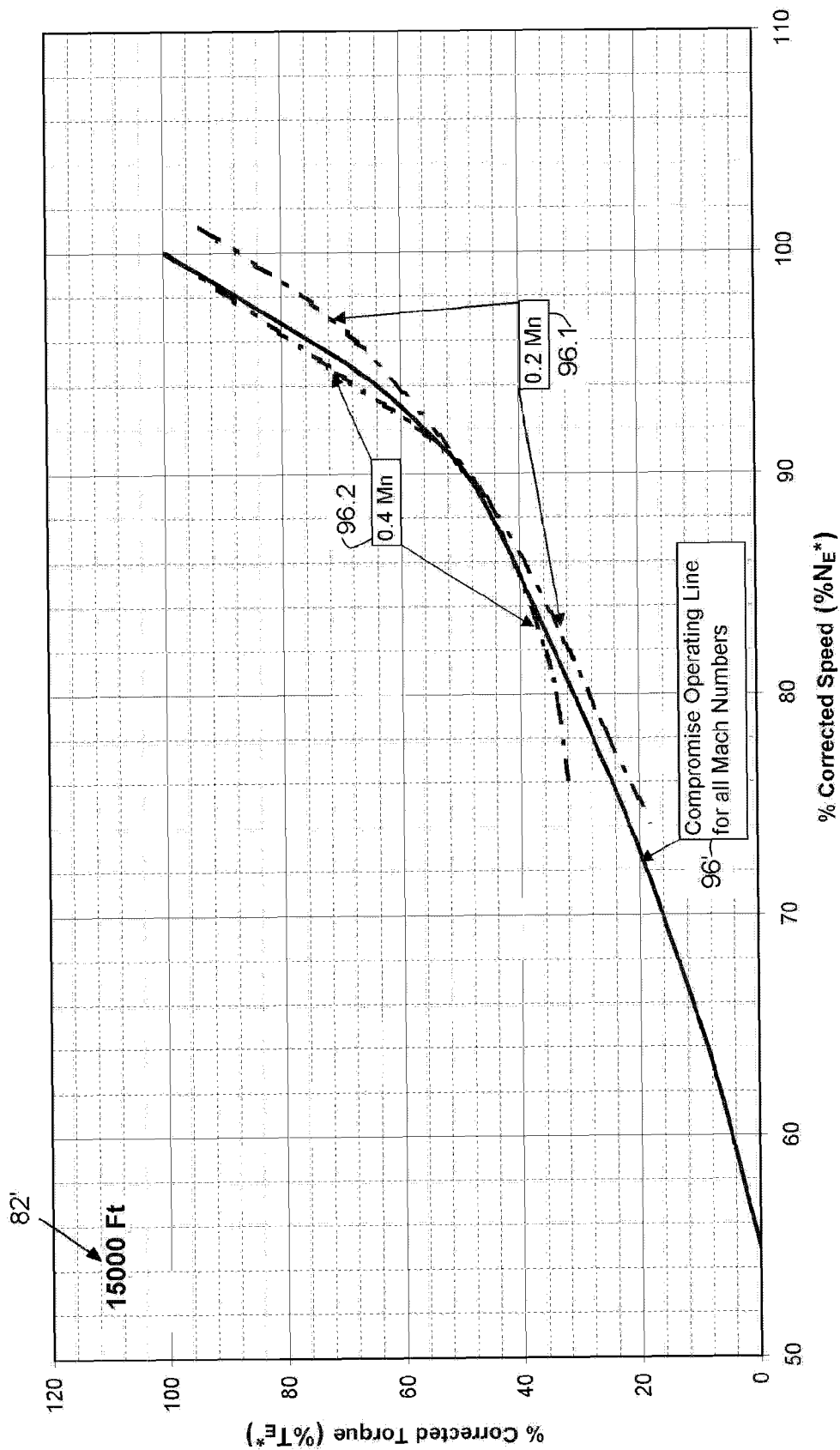
FIG. 5 illustrates a composite of plots of percent corrected engine torque as a function of percent corrected engine rotational speed for the minimum associated $TSFC_c$ for each level of $F_{nc}$ at an altitude of 15,000 feet at speeds of Mach 0.2 and Mach 0.4 from FIGS. 3 and 4, respectively, together with a plot of an associated compromise schedule of percent corrected engine torque as a function of percent corrected engine rotational speed for at least near-minimum associated $TSFC_c$ for each level of $F_{nc}$, independent of Mach number.

Alternatively, referring to FIG. 5, the first 96.1 and second 96.2 speed control schedules, possibly together with an additional one or more speed control schedules 96 at additional corresponding one or more associated airspeeds 82, may be used to develop an associated compromise speed control schedule 96' that is independent of airspeed 98, and that approximates each of the underlying first 96.1 and second 96.2 and possibly other 96 speed control schedules, for example, as a best fit or weighted best fit thereof, for example, using a form of regression analysis, or using engineering judgment to develop the compromise speed control schedule 96'. Accordingly, the compromise speed control schedule 96' can be implemented by an associated powerplant controller 78 without requiring a measurement of airspeed 98.

Figure 6:
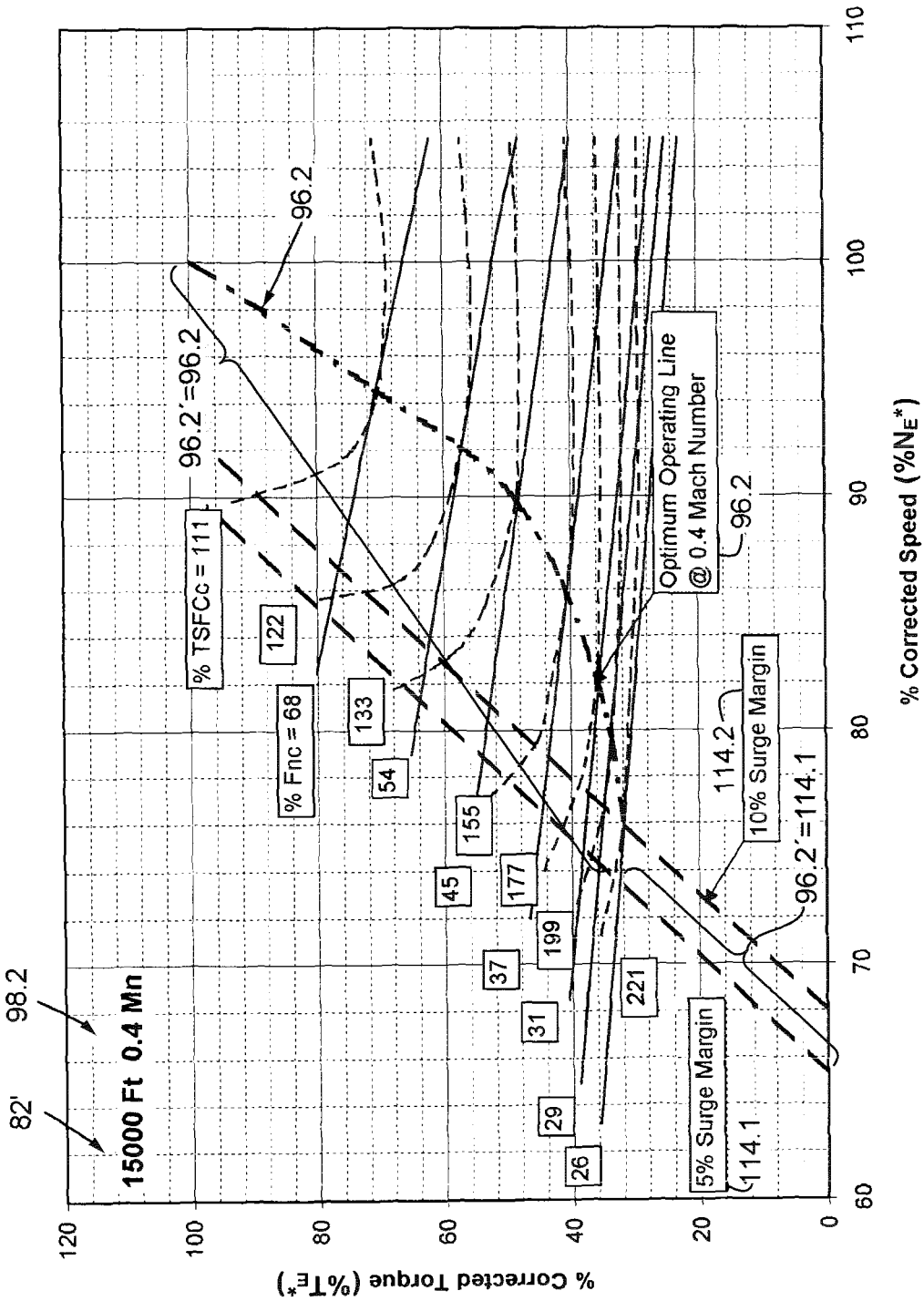
FIG. 6 illustrates a composite of a plurality of lines of constant compressor surge margin overlaid upon the plot illustrated in FIG. 4.
Figure 7:
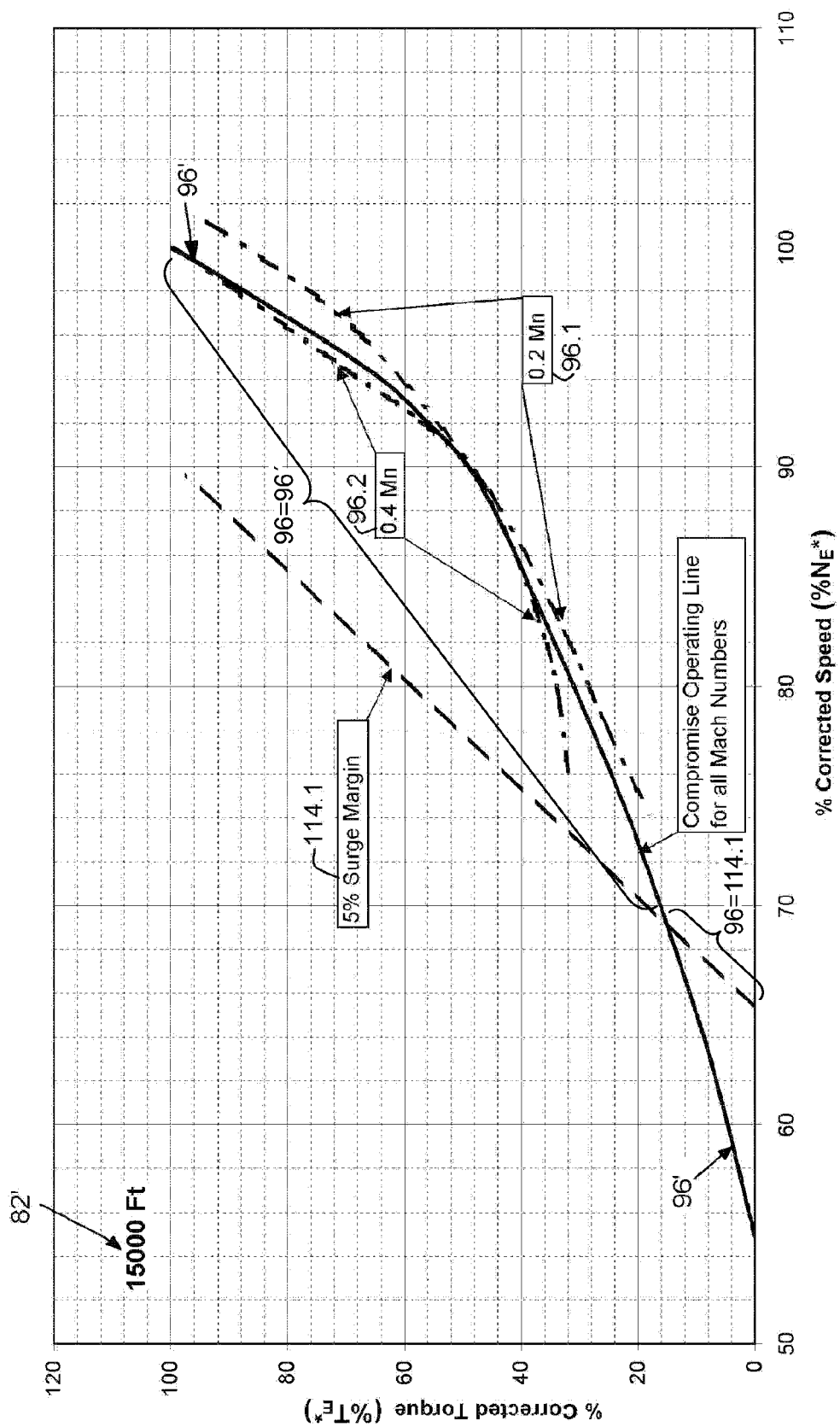
FIG. 7 illustrates a composite of a line of a constant 5 percent compressor surge margin overlaid upon the plot illustrated in FIG. 5.

The compressor 18 can be susceptible to surge or stall at a given corrected rotational engine speed $N_E^*$ if the associated corrected engine torque $T_E^*$ is sufficiently high, or at a given corrected engine torque $T_E^*$ if the associated corrected rotational engine speed $N_E^*$ is sufficiently low. Accordingly, surge or stall of the compressor 18 can be avoiding by imposing either an upper bound on corrected engine torque $T_E^*$ at a given corrected rotational engine speed $N_E^*$ or a lower bound on corrected rotational engine speed $N_E^*$ at a given corrected engine torque $T_E^*$, corresponding to an associated surge margin of the compressor 18, wherein the surge margin is defined as a percent difference in the mass air flow of the compressor 18 relative to the corresponding mass air flow at surge or stall. Referring to FIG. 6, there are illustrated surge margin schedules 114.1, 114.2 of corrected engine torque $T_E^*$ as a function of corrected rotational engine speed $N_E^*$ for a corresponding associated constant surge margin of 5 percent and 10 percent, respectively, superimposed upon the plots illustrated in FIG. 4 for the single-spool turboprop engine 10 operating at a cruising altitude 82' of 15,000 feet and at an airspeed 98.2 of Mach 0.4, showing the development of the associated second speed control schedule 96.2 of corrected engine torque $T_E^*$ as a function of corrected rotational engine speed $N_E^*$. Accordingly, for a given selected surge margin, for example, 5 percent, at any corrected rotational engine speed $N_E^*$ for which the corrected engine torque $T_E^*$ of the second speed control schedule 96.2 exceeds that of the first surge margin schedule 114.1, the corrected engine torque $T_E^*$ of the second speed control schedule 96.2 would be replaced by that of the first surge margin schedule 114.1 in a resulting effective second speed control schedule 96.2' that would then be either used directly to control the single-spool turboprop engine 10, or used to develop the associated compromise speed control schedule 96' described hereinabove. For example, FIG. 7 illustrates a 5 percent surge margin schedule 114.1 overlaid upon the plot of FIG. 5 and the compromise speed control schedule 96' illustrated therein, so as to provide for a resulting speed control schedule 96—for example, as illustrated in FIG. 8,—as the combination of the compromise speed control schedule 96' that provides for at least nearly minimizing corrected thrust specific fuel consumption (TSFC$_c$) for a given level of corrected net force ($F_{nc}$), and the 5 percent surge margin schedule 114.1 that provides for maintaining at least a 5 percent surge margin during operation of the compressor 18.

Referring to FIG. 9, the speed control schedule 96 is transformed to an equivalent relationship of corrected engine torque $T_E^*$ as a function of corrected engine horsepower $HP_E^*$, wherein for each value of corrected rotational engine speed $N_E^*$ of the speed control schedule 96 plotted in FIG. 8, the corresponding corrected engine horsepower $HP_E^*$ plotted in FIG. 9 is given from the corresponding corrected engine torque $T_E^*$ of the speed control schedule 96 plotted in FIG. 8, as follows:

$$HP_E^* = \frac{T_E^* \cdot N_E^*}{5252}. \quad (13)$$

The resulting torque vs. horsepower function 116 provides for determining a level of corrected engine torque $T_E^*$ that will provide for at least nearly minimizing corrected thrust specific fuel consumption ($TSFC_c$) for a given level of corrected net force ($F_{nc}$) at a given level of corrected engine horsepower $HP_E^*$. To that end, a first portion 116.1 of the torque vs. horsepower function 116 associated with data from the compromise speed control schedule 96' is mathematically modeled as:

$$T_E^* = f(HP_E^*) = a_0 + a_1 \cdot HP_E^* + a_2 \cdot HP_E^{*2}, \quad (14)$$

and a second portion 116.2 of the torque vs. horsepower function 116 associated with data from the 5 percent surge margin schedule 114.1 is mathematically modeled as:

$$T_E^* = f(HP_E^*) = b_0 + b_1 \cdot HP_E^*. \quad (15)$$

Aircraft single-spool turboprop engines 10 are typically flat rated to operate at a power level that is substantially below their maximum capability at sea level. By flat rating the power level of the single-spool turboprop engines 10, the associated gearbox 52 can be sized in accordance with this flat-rated power level, rather than the maximum possible power level of the single-spool turboprop engines 10, thereby providing for an associated substantial savings in cost and weight while still providing sufficient power for satisfactory takeoff performance. Accordingly, in accordance with this standard practice, the embodiment of the first torque control schedule 80, 80.1 described herein is adapted so that under a "Maximum Power" mode 74.1 of operation, as selected by the operating mode selector 72, the power level of the single-spool turboprop engine 10 is set to an upper-bound power level 118 substantially independent of environmental condition (i.e. total inlet air pressure P and total inlet air temperature T) and substantially independent of aircraft operating condition (i.e. altitude 82 and airspeed 98), to a level that is substantially less than the associated sea level capability thereof. For example, referring to FIG. 10, an upper-bound power level 118 corresponding to a maximum rated power of the gas turbine engine 22 is used for purposes of illustrating the embodiments herein, but this particular level is not otherwise limiting. For a given level of engine horsepower $HP_E$, the corresponding level of corrected engine horsepower $HP_E^*$ is given by substituting for corrected engine torque $T_E^*$ and corrected rotational engine speed $N_E^*$ in equation (13) from equations (1) and (5), as follows:

$$HP_E^* = \frac{T_E^* \cdot N_E^*}{5252} = \frac{T_E \cdot N_E}{5252 \cdot \delta \cdot \sqrt{\theta}} = f(HP_E, P, T) = \frac{HP_E}{\delta \cdot \sqrt{\theta}}. \quad (16)$$

Substituting for corrected engine horsepower $HP_E^*$ from equation (16) in equations (14) and (15), respectively gives:

$$T_E^* = f(P, T, HP_E) = a_0 + a_1 \cdot \left(\frac{HP_E}{\delta \cdot \sqrt{\theta}}\right) + a_2 \cdot \left(\frac{HP_E}{\delta \cdot \sqrt{\theta}}\right)^2, \quad (14.1)$$

$$T_E^* = f(P, T, HP_E) = b_0 + b_1 \cdot \left(\frac{HP_E}{\delta \cdot \sqrt{\theta}}\right). \quad (15.1)$$

wherein $\delta = f(P)$ from equation (2), and $\theta = f(T)$ from equation (6).

Referring to FIG. 10, equations (14.1) and (15.1) are then used to plot corrected engine torque $T_E^*$ as a function of total inlet air pressure P for a family of values of total inlet air temperature T, for values of total inlet air pressure P ranging from 5 to 16 psia (pounds per square inch absolute), and for values of total inlet air temperature T of −65 degrees F. (Fahrenheit), −15 degrees F., 35 degrees F., 85 degrees F. and 130 degrees F. covering the range of environmental operating conditions of the single-spool turboprop engine 10, for a constant engine horsepower $HP_E$ level at the upper-bound power level 118. Accordingly, FIG. 10 provides a torque control schedule 80 that provides for operating the single-spool turboprop engine 10 at an engine horsepower $HP_E$ level at the upper-bound power level 118 under any environmental condition in accordance with the compromise speed control schedule 96' that provides for nominally minimal associated corrected thrust specific fuel consumption ($TSFC_c$).

Alternatively, equation (16) may be rearranged to solve for the corrected engine torque $T_E^*$, with substitution for $N_E^*$ from equation (4), as follows:

$$T_E^* = f(P, T, HP_E) = \frac{HP_E \cdot 5252}{\delta \cdot \sqrt{\theta} \cdot N_E^*} = \frac{HP_E \cdot 5252}{\delta \cdot \sqrt{\theta} \cdot f^{-1}(T_E^*)} \quad (17)$$

and then the corresponding value of corrected engine torque $T_E^*$ may be found numerically for given values of total inlet air pressure P, total inlet air temperature T, engine horsepower $HP_E$ from the root of:

$$T_E^* - \frac{HP_E \cdot 5252}{\delta \cdot \sqrt{\theta} \cdot f^{-1}(T_E^*)} = 0 \quad (18)$$

so as to provide for generating the data plotted in FIG. 10, wherein $f^{-1}(T_E^*)$ from equation (4) is a representation of the functional relationship illustrated in FIG. 8, either in the form of a curve-fitted equation, or from a corresponding table lookup, and could be further generalized to also be a function of altitude and/or Mach number.

Referring to FIG. 11, the first torque control schedule 80, 80.1 for operation above the AGL threshold altitude 86, or with the landing gear up, with at least near-minimum corrected thrust specific fuel consumption ($TSFC_c$) for a given level of corrected net force ($F_{nc}$) under the "Maximum Power" mode 74.1 is given from the torque control schedule 80 illustrated in FIG. 10, but with additional limits on corrected engine torque $T_E^*$ at relatively lower levels of total inlet air pressure P and relatively higher levels of total inlet air temperature T so that the associated turbine inlet temperature T" is prevented from exceeding a turbine inlet temperature threshold 120.

Referring to FIG. 12, the second torque control schedule 80, 80.2—used when operating in the "Idle" mode 74.2 either above the AGL threshold altitude 86 AND with the landing gear up; OR when on the ground 85, so as to provide for at least near-minimum corrected thrust specific fuel consumption (TSFC$_c$) for a given level of corrected net force (F$_{nc}$), and a relatively lower rotational propeller speed N$_P$ for relatively quieter operation on the ground 85—is given by a process similar to that used to develop the torque control schedule 80 illustrated in FIG. 10, but instead using a constant lower-bound power level 122 for engine horsepower HP$_E$ in equation (16), for example, a lower-bound power level 122 of about 3 percent of the corresponding upper-bound power level 118. Accordingly, in FIG. 12, depending upon the associated level of corrected engine horsepower HP$_E$*, either equation (14) or equation (15) is used to develop the second torque control schedule 80, 80.2, for example, illustrated by plots of corrected engine torque T$_E$* as a function of total inlet air pressure P for a family of values of total inlet air temperature T, responsive to input from equations (2) and (6), for values of total inlet air pressure P ranging from 5 to 16 psia (pounds per square inch absolute), and for values of total inlet air temperature T of −65 degrees F. (Fahrenheit), −15 degrees F., 35 degrees F., 85 degrees F. and 130 degrees F., covering the range of environmental operating conditions of the single-spool turboprop engine 10, for a constant engine horsepower HP$_E$ level at the lower-bound power level 122.

For operation of the single-spool turboprop engine 10 at altitudes 82 less than the AGL threshold altitude 86, or with the landing gear down, the powerplant controller 78 provides for running the single-spool turboprop engine 10 with the rotational propeller speed N$_P$ set to a constant takeoff rotational speed level 88 so as to provide for maximum responsiveness of the gas turbine engine 22 to requested changes of operating power from changes in operating mode 74 by the pilot during takeoff and landing, for example, so as to provide for relatively fast acceleration or deceleration of the aircraft 14. Under such conditions, engine torque T$_E$ would not be needed to accelerate or decelerate the rotating elements of the single-spool turboprop engine 10 and associated variable pitch propeller assembly 54, each having an associated rotational moment of inertia but rotating at a constant associated rotational speed, so that any change in power level of the gas turbine engine 22 would be transformed effectively nearly-immediately into a change of thrust acting upon the aircraft 14.

For example, referring to FIG. 13, the third torque control schedule 80, 80.3 for operation below the AGL threshold altitude 86, or with the landing gear down, under the "Maximum Power" mode 74.1 is given by first determining the corrected engine horsepower HP$_E$* for values of total inlet air pressure P ranging from 5 to 16 psia (pounds per square inch absolute), and for values of total inlet air temperature T of −65 degrees F. (Fahrenheit), −15 degrees F., 35 degrees F., 85 degrees F. and 130 degrees F., covering the range of environmental operating conditions of the single-spool turboprop engine 10, for a constant engine horsepower HP$_E$ at the upper-bound power level 118, and finding therefrom the nominal associated corrected engine torque T$_E$* for the third torque control schedule 80, 80.3 as follows:

$$T_E^* = \frac{5252 \cdot HP_E^*}{N_E^*}, \quad (19)$$

with the rotational propeller speed N$_P$ set to a constant takeoff rotational speed level 88, for example, a level for which the corresponding rotational engine speed N$_E$ provides for maximum or near-maximum rated power. The third torque control schedule 80, 80.3 is then given either by limiting the resulting nominal associated corrected engine torque T$_E$* at relatively lower levels of total inlet air pressure P and relatively higher levels of total inlet air temperature T so that the associated turbine inlet temperature T" is less than the turbine inlet temperature threshold 120, or otherwise using the level of nominal associated corrected engine torque T$_E$* for the associated total inlet air temperature T at the low temperature limit 124, for example, −65 degrees F. More particularly, in the embodiment illustrated in FIG. 13, for operation at a total inlet air temperature T of −65 degrees F., the third torque control schedule 80, 80.3 provides for operation in accordance with the operating lines indicated by the labels "Max Corrected Torque", and "Max Power", for which the turbine inlet temperature T" is less than the turbine inlet temperature threshold 120 for all conditions of total inlet air pressure P.

Referring to FIG. 14, the fourth torque control schedule 80, 80.4 for operation below the AGL threshold altitude 86, OR with the landing gear down, under the "Idle" mode 74.2 is given by a process similar to that used to develop the torque control schedule 80 illustrated in FIG. 13, but using a constant lower-bound power level 122 for engine horsepower HP$_E$ in equation (17), for example, a lower-bound power level 122 of about 3 percent of the corresponding upper-bound power level 118, with the associated total inlet air temperature T at the low temperature limit 124, for example, −65 degrees F., so that the fourth torque control schedule 80, 80.4 is independent of total inlet air temperature T.

The torque control schedules 80 may also be adapted to account for additional or other limitations on the operation of the gas turbine engine 22 besides just surge margin or turbine inlet temperature T", for example, associated rotor speeds, other temperature limits, or pressure limits. Furthermore, the torque control schedules 80 and/or the speed control schedule 96 could be adapted with additional mathematical dimensions to explicitly account for other parameters, such as altitude 82 or airspeed 98.

It should be understood that additional torque control schedules 80 could be generated for other associated operating modes 74, for example, "Maximum Climb" or "Maximum Cruise", to which may be associated different turbine inlet temperature T" or rotational propeller speed N$_P$ limits, for example, so as to account for different expected or rated duty cycles associated with those operating modes 74.

Figure 15:
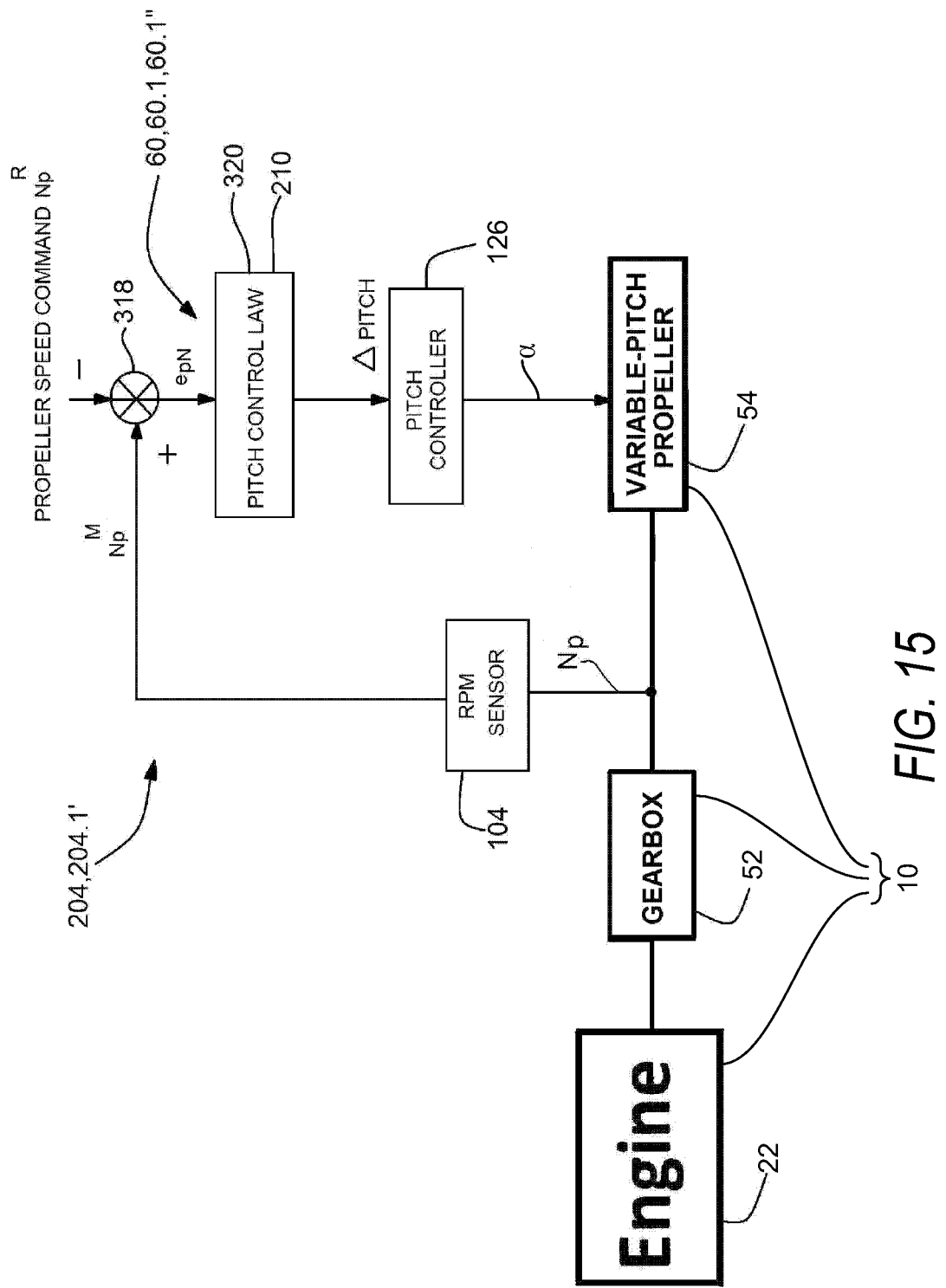
FIG. 15 illustrates a block diagram of a closed-loop control system and associated method for regulating propeller speed by adjusting propeller pitch responsive to a measurement of rotational propeller speed.

Referring again to the single-spool turboprop engine control system 200, 200.1 illustrated in FIGS. 2a and 2b, and referring to FIG. 15, in accordance with an alternative embodiment, the associated speed control loop 204, 204.1' comprises a propeller blade pitch control system 60 incorporating a closed-loop control system-style governor 60.1" wherein, in step (318), the measured rotational propeller speed N$_P^M$ from the propeller rotational speed sensor 104 is subtracted from the rotational propeller speed reference N$_P^R$ to provide a resulting propeller speed error e$_{PN}$ as follows:

$$e_{PN} = N_P^R - N_P^M \quad (20)$$

which, in step (320), is input to a propeller blade pitch control law 210 that determines and communicates an associated blade control command ΔPitch to an associated propeller blade pitch controller 126 of the propeller blade pitch control system 60, which in turn controls the common propeller blade pitch α of the propeller blades 58 of the variable pitch propeller assembly 54 so as to null the propeller speed error e$_{PN}$ and thereby regulate the resulting rotational propeller speed N$_P$ to the level of the associated rotational propeller speed reference N$_P^R$. As one of ordinary skill in the art will understand, the set of reference characters 204, 204.1' herein and in FIG. 15 indicates that the alternative embodiment 204.1' is a particular species of a generic speed control loop 204.

Figure 16A:
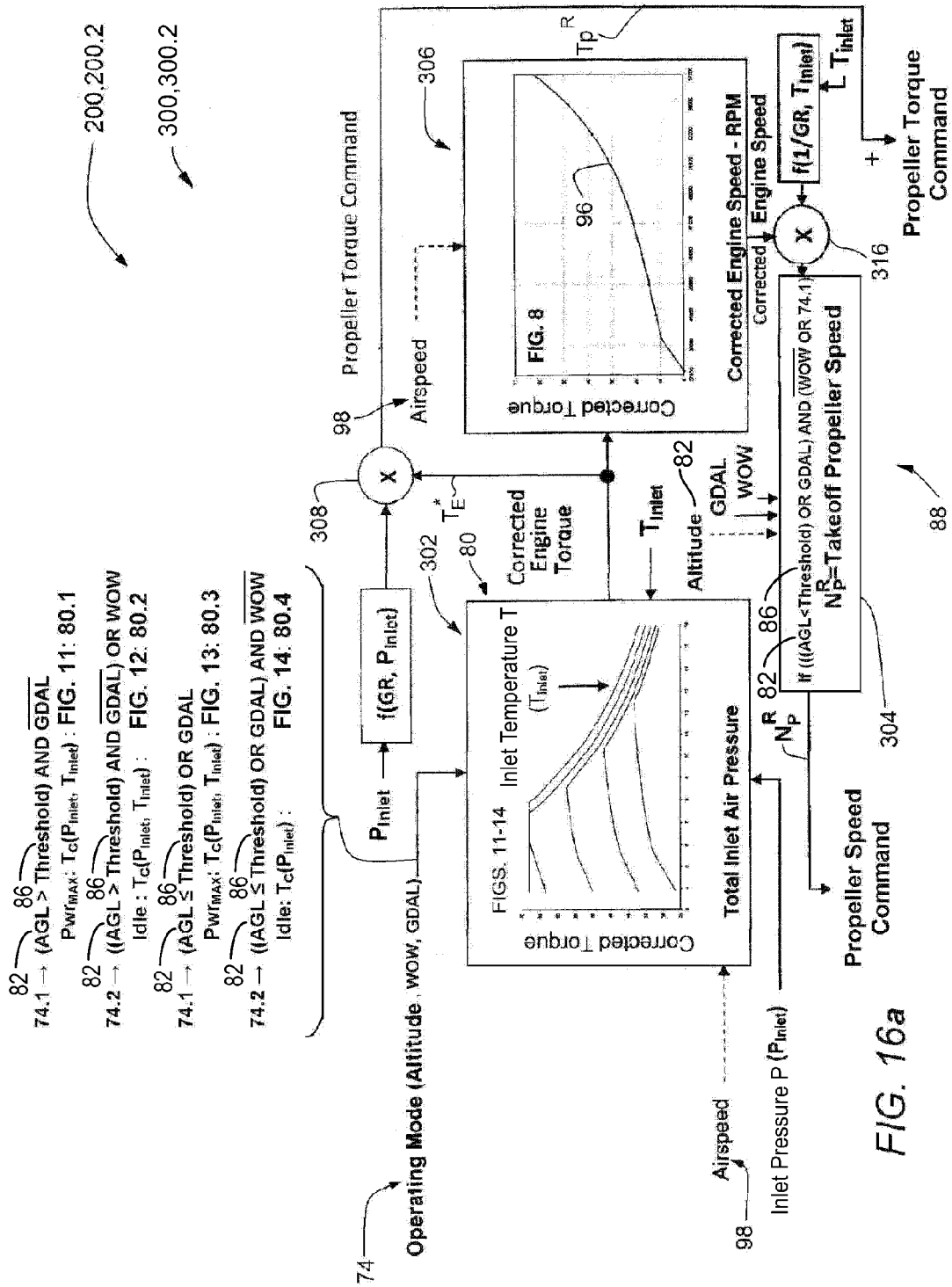
FIGS. 16a and 16b illustrates a block diagram of a second aspect of a system and method for controlling a single-spool turboprop engine.
Figure 16B:
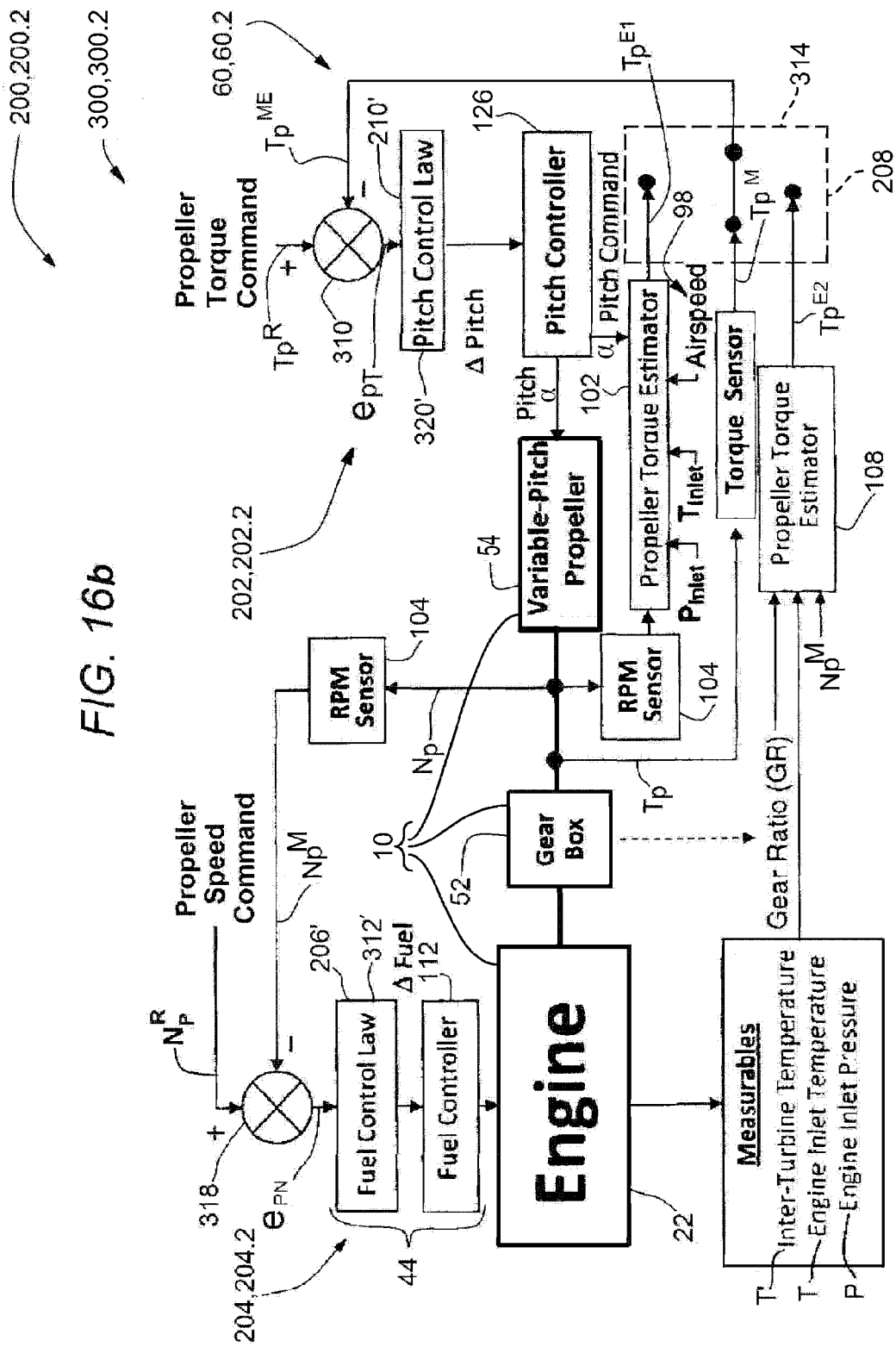

Referring to FIGS. 16a and 16b, a second aspect of a single-spool turboprop engine control system 200, 200.2 in cooperation with an associated second aspect of the associated control algorithm 300, 300.2 is the same as the first aspect of the single-spool turboprop engine control system 200, 200.1 in cooperation with the first aspect of the associated control algorithm 300, 300.1, except for both the associated torque control loop 202, 202.2 and the associated speed control loop 204, 204.2, wherein the second aspect of the torque control loop 202, 202.2 provides for controlling the common propeller blade pitch α of the variable pitch propeller assembly 54 to regulate on either engine torque $T_E$ or propeller torque $T_P$, and the second aspect of the speed control loop 204, 204.2 provides for controlling the flow of fuel 40 to the gas turbine engine 22 to regulate the rotational propeller speed $N_P$. As one of ordinary skill in the art will understand, the set of reference characters 200, 200.2 herein and in FIGS. 16a and 16b indicates that the second aspect 200.2 is a particular species of the generic single-spool turboprop engine control system 200; the set of reference characters 300, 300.2 herein and in FIGS. 16a and 16b indicates that the second aspect 300.2 is a particular species of a generic control algorithm 300; the set of reference characters 202, 202.2 herein and in FIG. 16b indicates that the second aspect 202.2 is a particular species of a generic torque control loop 202; and the set of reference characters 204, 204.2 herein and in FIG. 16b indicates that the second aspect 204.2 is a particular species of a generic speed control loop 204.

More particularly, in one embodiment, the second aspect of the torque control loop 202, 202.2 comprises a propeller blade pitch control system 60, 60.2 wherein, in step (310), the measured or estimated level of propeller torque $T_P^{ME}$, i.e. normally the measured propeller torque $T_P^M$, but alternatively, either the first estimated propeller torque $T_P^{E1}$, the second estimated propeller torque $T_P^{E2}$, or a combination thereof, as provided in accordance with the first aspect of the single-spool turboprop engine control system 200, 200.1 and described hereinabove, is subtracted from the propeller torque reference $T_P^R$ from step (308)—wherein the propeller torque reference $T_P^R$ is given by equation (9) from corrected engine torque $T_E^*$, and the corrected engine torque $T_E^*$ is given from the torque control schedule 80, 80.1, 80.2, 80.3, 80.4—so as to provide a resulting propeller torque error $e_{PT}$ given by equation (10), which, in step (320'), is input to a propeller blade pitch control law 210' that determines and communicates an associated blade control command ΔPitch to the associated propeller blade pitch controller 126 of the propeller blade pitch control system 60, 60.2, which in turn controls the common propeller blade pitch α of the propeller blades 58 of the variable pitch propeller assembly 54 so as to null the propeller torque error $e_{PT}$ and thereby regulate the resulting measured or estimated level of propeller torque $T_P^{ME}$ to the level of the associated propeller torque reference $T_P^R$.

As one of ordinary skill in the art will understand, the set of reference characters 60, 60.1, 60.1', 60.1" in FIG. 1 indicates that the governor 60.1, mechanical flyball-style governor 60.1', closed-loop control system-style governor 60.1" are each different embodiments or species of a generic propeller blade pitch control system 60, and that the mechanical flyball-style governor 60.1', closed-loop control system-style governor 60.1" are each different embodiments or species of a generic governor 60.1. Similarly, the set of reference characters 60, 60.1, 60.1' in FIG. 2b indicates that the governor 60.1 and mechanical flyball-style governor 60.1' are each different embodiments or species of a generic propeller blade pitch control system 60, and that the mechanical flyball-style governor 60.1' is a particular embodiment or species of a generic governor 60.1. Similarly, the set of reference characters 60, 60.1, 60.1" in FIG. 15 indicates that the governor 60.1 and closed-loop control system-style governor 60.1" are each different embodiments or species of a generic propeller blade pitch control system 60, and that the closed-loop control system-style governor 60.1" is a particular embodiment or species of a generic governor 60.1. Similarly, the set of reference characters 60, 60.2 in FIG. 16b indicates a particular embodiment or species 60.2 of a generic propeller blade pitch control system 60.

Furthermore, in accordance with the second aspect of the speed control loop 204, 204.2, in step (318), the measured rotational propeller speed $N_P^M$ from the propeller rotational speed sensor 104 is subtracted from the rotational propeller speed reference $N_P^R$, given by equation (12) from the corrected rotational engine speed $N_E^*$, to provide a resulting propeller speed error $e_{PN}$, which, in step (312'), is input to the fuel control law 206' that determines an associated fuel control command (e.g. Δ Fuel) to an associated fuel controller 112 of the fuel control system 44, which in turn controls the flow of fuel 40 from the fuel supply 46 to the fuel injector 42 for injection into the combustion chamber 38 of the gas turbine engine 22 so as to null the propeller speed error $e_{PN}$ and thereby regulate the resulting measured rotational propeller speed $N_P^M$ to the level of the associated rotational propeller speed reference $N_P^R$.

Accordingly, either the first 200.1 or second 200.2 aspects of the generic single-spool turboprop engine control system 200 provide for operating the associated single-spool turboprop engine 10 at a level of rotational engine speed $N_E$ for a given associated engine torque $T_E$ that provides for at least nearly minimizing fuel consumption at the power level associated with a given operating mode, either while operating on the ground or while operating at altitudes in excess of an associated AGL threshold altitude 86; and provide for operating the single-spool turboprop engine 10 at a constant take-off rotational speed level 88 of rotational propeller speed $N_P$ when operating below the AGL threshold altitude 86 during takeoff and landing so as to provide for the maximum possible responsiveness of the single-spool turboprop engine 10 to changes in requested power level, while also limiting the associated turbine inlet temperature T" to an acceptable level. Furthermore, the first 200.1 or second 200.2 aspects of the generic single-spool turboprop engine control system 200 provide for operating the single-spool turboprop engine 10 at relatively high compressor efficiency and with sufficient surge margin so as to avoid surge or stall thereof over the operating range of the single-spool turboprop engine 10, and in a manner that is relatively unsusceptible to lean blowout of the flame in the combustion chamber 38 of the gas turbine engine 22.

The rotational propeller speed $N_P$ and propeller torque $T_P$ control variables together account for the power transmitted to the variable pitch propeller assembly 54, and therefore in a normally operating variable pitch propeller assembly 54 account for the propeller-generated thrust 56 acting on the aircraft 14. Accordingly, as a result of the rotational propeller speed $N_P$ and propeller torque $T_P$ being controlled by the first 200.1 and second 200.2 aspects of the single-spool turboprop engine control system 200, the associated propeller-generated thrust 56 acting on the aircraft 14 will be substantially unaffected by a deterioration of the single-spool turboprop engine 10, for example, as a result of aging, although a deteriorated single-spool turboprop engine 10 would be expected to run at higher levels of turbine inlet temperature T″ in order to provide the same level of propeller-generated thrust 56.

Generally, other control variables could be used instead of propeller torque $T_P$, for example engine inter-turbine temperature T′ and one or more internal pressure ratios of the gas turbine engine 22, however these may not provide the same level of invariance to deterioration of the single-spool turboprop engine 10 as would propeller torque T. Furthermore, rotational engine speed $N_E$, or some intermediate speed of the gear train within the gearbox 52 could be used equivalently instead of rotational propeller speed $N_P$ because all the rotating elements of the single-spool turboprop engine 10 rotate in synchronism.

It should be understood that the particular numerical values given herein are strictly for purposes of illustration, and are not otherwise limiting as to the scope of any claims. For example, the first 200.1 and second 200.2 aspects of the generic single-spool turboprop engine control system 200 may be used irrespective of the size, i.e. power level, of the single-spool turboprop engine 10. For example, the data in the plots illustrated in FIGS. 3-14 is expressed in relative terms, with percent corrected engine torque % $T_E^*$, percent corrected engine horsepower % $HP_E^*$ and percent corrected rotational engine speed % $N_E^*$ respectively expressed as percentages of maximum rated corrected engine torque $T_E^*$, corresponding maximum rated corrected engine horsepower $HP_E^*$ and maximum rated corrected rotational engine speed $N_E^*$ at sea level conditions, respectively.

It should also be understood that generally a measure of external total temperature could be substituted for total inlet air temperature T.

Although the first 200.1 and second 200.2 aspects of the generic single-spool turboprop engine control system 200 are illustrated in the context of controlling a single-spool turboprop engine 10, it should be understood that these control systems could also be used with any type of single-spool turboshaft engine driving any load—either mobile or stationary—that can be controlled or varied, for example, with a load comprising a controllable-output-current generator instead of a variable pitch propeller assembly 54.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of controlling a single-spool turboshaft engine operatively connected to a controllable load, comprising:
  a. receiving a corrected torque command, wherein said corrected torque command is representative of a level of torque to be transmitted by an element operatively connecting said single-spool turboshaft engine to said controllable load so as to drive said controllable load;
  b. under at least one operating condition of said single-spool turboshaft engine, determining a corrected rotational speed command representative of a rotational speed responsive to an engine speed of said single-spool turboshaft engine, wherein a level of said corrected rotational speed command is determined responsive to either said corrected torque command or a corresponding said level of torque so as to minimize or nearly minimize a measure of fuel consumption by said single-spool turboshaft engine when operated so that a torque transmitted by said element operatively connecting said single-spool turboshaft engine to said controllable load is substantially equal in magnitude to said level of torque;
  c. controlling said controllable load to said single-spool turboshaft engine so that said rotational speed responsive to said engine speed of said single-spool turboshaft engine is substantially regulated to a level corresponding to said corrected rotational speed command; and
  d. controlling the other of said controllable load or said fuel flow to said single-spool turboshaft engine so that said torque transmitted by said element operatively connecting said single-spool turboshaft engine to said controllable load is substantially regulated to said level corresponding to said corrected torque command.

2. A method of controlling a single-spool turboshaft engine operatively connected to a controllable load as recited in claim 1, wherein the operation of determining said corrected rotational speed command representative of said rotational speed responsive to said engine speed of said single-spool turboshaft engine comprises limiting a lower bound of said corrected rotational speed command so as to prevent a surge condition in said single-spool turboshaft engine.

3. A method of controlling a single-spool turboshaft engine operatively connected to a controllable load as recited in claim 1, wherein the operation of controlling said controllable load to said single-spool turboshaft engine comprises controlling a load level of said controllable load so that said rotational speed responsive to said engine speed of said single-spool turboshaft engine is substantially regulated to said level corresponding to said corrected rotational speed command; and the operation of controlling the other of said controllable load or said fuel flow to said single-spool turboshaft engine comprises controlling said fuel flow so that said torque transmitted by said element operatively connecting said single-spool turboshaft engine to said controllable load is substantially regulated to said level corresponding to said corrected torque command.

4. A method of controlling a single-spool turboshaft engine operatively connected to a controllable load as recited in claim 3, wherein said controllable load comprises a variable-pitch propeller assembly operatively coupled to said single-spool turboshaft engine through a gearbox, said corrected rotational speed command comprises a corrected rotational speed of said single-spool turboshaft engine, and the operation of controlling said controllable load comprises controlling a pitch of said variable-pitch propeller assembly responsive to a propeller speed command responsive to said corrected rotational speed command so as to regulate a rotational speed of said variable-pitch propeller assembly to a level corresponding to said propeller speed command.

5. A method of controlling a single-spool turboshaft engine operatively connected to a controllable load as recited in claim 4, wherein the operation of controlling said pitch of said variable-pitch propeller assembly comprises controlling a force in a governor spring of a governor of said variable-pitch propeller assembly so as to provide for regulating said rotational speed of said variable-pitch propeller assembly to said level corresponding to said propeller speed command.

6. A method of controlling a single-spool turboshaft engine operatively connected to a controllable load as recited in claim 4, wherein the operation of controlling said pitch of said variable-pitch propeller assembly comprises controlling a blade pitch actuator of said variable-pitch propeller assembly responsive to a measure of said rotational speed of said variable-pitch propeller assembly so as to provide for regulating said rotational speed of said variable-pitch propeller assembly to said level corresponding to said propeller speed command.

7. A method of controlling a single-spool turboshaft engine operatively connected to a controllable load as recited in claim 3, wherein said controllable load comprises a variable-pitch propeller assembly operatively coupled to said single-spool turboshaft engine through a gearbox, said corrected torque command comprises a corrected torque of said single-spool turboshaft engine, and the operation of controlling said fuel flow comprises controlling said fuel flow to said single-spool turboshaft engine responsive to a propeller torque command responsive to said corrected torque command so as to regulate said torque transmitted by said element operatively connecting said single-spool turboshaft engine to said controllable load to a level corresponding to said propeller torque command.

8. A method of controlling a single-spool turboshaft engine operatively connected to a controllable load as recited in claim 7, wherein the operation of controlling said fuel flow to said single-spool turboshaft engine is responsive to a measure of torque transmitted by said element so as to provide for regulating said torque transmitted by said element to a level corresponding to said propeller torque command.

9. A method of controlling a single-spool turboshaft engine operatively connected to a controllable load as recited in claim 7, wherein the operation of controlling said fuel flow to said single-spool turboshaft engine is responsive to an estimate of said torque transmitted by said element, wherein said estimate of said torque is calculated responsive to a gear ratio of said gearbox and said estimate of said torque is calculated responsive to measures responsive to an inlet temperature, an inlet pressure, and an inter-turbine temperature of said single-spool turboshaft engine so as to provide for regulating said torque transmitted by said element to said level corresponding to said propeller torque command.

10. A method of controlling a single-spool turboshaft engine operatively connected to a controllable load as recited in claim 7, wherein the operation of controlling said fuel flow to said single-spool turboshaft engine is responsive to an estimate of said torque transmitted by said element, wherein said estimate of said torque is calculated responsive to measures responsive to an inlet temperature and an inlet pressure of said single-spool turboshaft engine, and said estimate of said torque is calculated responsive to measures of a rotational speed of said variable-pitch propeller assembly, a pitch command to said variable-pitch propeller assembly, and an air speed of an aircraft incorporating said variable-pitch propeller assembly so as to provide for regulating said torque transmitted by said element to said level corresponding to said propeller torque command.

11. A method of controlling a single-spool turboshaft engine operatively connected to a controllable load as recited in claim 1, wherein the operation of controlling one of said controllable load or said fuel flow to said single-spool turboshaft engine comprises controlling said fuel flow so that said rotational speed responsive to said engine speed of said single-spool turboshaft engine is substantially regulated to said level corresponding to said corrected rotational speed command; and the operation of controlling the other of said controllable load or said fuel flow to said single-spool turboshaft engine comprises controlling a load level of said controllable load so that said torque transmitted by said element operatively connecting said single-spool turboshaft engine to said controllable load is substantially regulated to said level corresponding to said corrected torque command.

12. A method of controlling a single-spool turboshaft engine operatively connected to a controllable load as recited in claim 11, wherein said controllable load comprises a variable-pitch propeller assembly operatively coupled to said single-spool turboshaft engine through a gearbox, said corrected torque command comprises a corrected torque of said single-spool turboshaft engine, and the operation of controlling said controllable load comprises controlling a pitch of said variable-pitch propeller assembly responsive to a propeller torque command responsive to said corrected torque command as to regulate said torque transmitted by said element operatively connecting said single-spool turboshaft engine to said controllable load to a level corresponding to said propeller torque command.

13. A method of controlling a single-spool turboshaft engine operatively connected to a controllable load as recited in claim 12, wherein the operation of controlling said pitch of said variable-pitch propeller assembly is responsive to a measure of torque transmitted by said element so as to provide for regulating said torque transmitted by said element to said level corresponding to said propeller torque command.

14. A method of controlling a single-spool turboshaft engine operatively connected to a controllable load as recited in claim 12, wherein the operation of controlling said pitch of said variable-pitch propeller assembly is responsive to an estimate of said torque transmitted by said element responsive to a gear ratio of said gearbox and responsive to measures responsive to an inlet temperature, an inlet pressure, and an inter-turbine temperature of said single-spool turboshaft engine so as to provide for regulating said torque transmitted by said element to said level corresponding to said propeller torque command.

15. A method of controlling a single-spool turboshaft engine operatively connected to a controllable load as recited in claim 14, wherein the operation of controlling said pitch of said variable-pitch propeller assembly is responsive to an estimate of said torque transmitted by said element responsive to measures responsive to an inlet temperature and an inlet pressure of said single-spool turboshaft engine, and responsive to measures of a rotational speed of said variable-pitch propeller assembly, a pitch command to said variable-pitch propeller assembly, and an air speed of an aircraft incorporating said variable-pitch propeller assembly so as to provide for regulating said torque transmitted by said element to said level corresponding to said propeller torque command.

16. A method of controlling a single-spool turboshaft engine operatively connected to a controllable load as recited in claim 11, wherein said controllable load comprises a variable-pitch propeller assembly operatively coupled to said single-spool turboshaft engine through a gearbox, said corrected rotational speed command comprises a corrected rotational speed of said single-spool turboshaft engine, and the operation of controlling said fuel flow comprises controlling said fuel flow to said single-spool turboshaft engine responsive to a propeller speed command responsive to said corrected rotational speed command so as to provide for regulating said rotational speed of said variable-pitch propeller assembly to a level corresponding to said propeller speed command.

17. A method of controlling a single-spool turboshaft engine operatively connected to a controllable load as recited in claim 16, wherein the operation of controlling said fuel flow to said single-spool turboshaft engine is responsive to a measure of said rotational speed of said variable-pitch propeller assembly so as to provide for regulating said rotational speed of said variable-pitch propeller assembly to said level corresponding to said propeller speed command.

18. A method of controlling a single-spool turboshaft engine operatively connected to a controllable load as recited in claim 1, wherein the operation of determining said corrected rotational speed command representative of said rotational speed responsive to said engine speed of said single-spool turboshaft engine is responsive to a functional relationship between a value of said corrected rotational speed command and a corresponding value of said corrected torque command for a range of corrected torque command values and a corresponding range of corrected rotational speed command values.

19. A method of controlling a single-spool turboshaft engine operatively connected to a controllable load as recited in claim 1, wherein said level of said corrected rotational speed command is determined responsive to a measure of air speed of said single-spool turboshaft engine.

20. A method of controlling a single-spool turboshaft engine operatively connected to a controllable load as recited in claim 1, wherein said corrected torque command is representative of a corresponding level of torque at a standard atmospheric condition, and said corrected rotational speed command is representative of a corresponding rotational speed at said standard atmospheric condition.

21. A method of controlling a single-spool turboshaft engine operatively connected to a controllable load as recited in claim 20, wherein said corrected torque command is determined as a ratio of a corresponding torque command value divided by a normalized inlet air pressure, said corrected rotational speed command is determined as a ratio of a corresponding rotational speed command value divided by the square root of a normalized inlet air temperature, said normalized inlet air pressure is determined as a ratio of inlet air pressure divided by a corresponding air pressure at said standard atmospheric condition, said normalized inlet air temperature is determined as a ratio of inlet air temperature divided by a corresponding air temperature at said standard atmospheric condition, said torque command value corresponds to a measured or estimated torque value, and said rotational speed command value corresponds to a measured rotational speed value.

* * * * *

UNITED STATES PATENT AND TRADEMARK OFFICE
CERTIFICATE OF CORRECTION

PATENT NO. : 9,008,943 B2
APPLICATION NO. : 13/956439
DATED : April 14, 2015
INVENTOR(S) : Ray D. Lickfold, Gregg G. Williams and Robert S. Thompson, Jr.

It is certified that error appears in the above-identified patent and that said Letters Patent is hereby corrected as shown below:

Specification
Column 13, Line 35, "first $T_P^{E2}$" should be changed to --first $T_P^{E1}$--.
Column 14,
 Lines 6-7, "first estimated propeller torque $T_P^{M}$" should be changed to
  --first estimated propeller torque $T_P^{E1}$--; and
 Line 28, Equation (11), " $T_E^R = T_E^* \delta$ " should be changed to -- $T_E^R = T_E^* \cdot \delta$ --.
Column 22, Line 22, "A Fuel" should be changed to --Δ Fuel--.
Column 23, Line 8, "propeller torque T" should be changed to --propeller torque $T_P$--.
Claims
Column 24, Lines 34 and 55-56, Claims 1 and 3, "said controllable load" should be changed to
 --one of said controllable load or a fuel flow--. (two occurrences)
Column 25, Lines 57-58, Claim 9; and Column 26, Lines 2-3, Claim 10,
 ", wherein said estimate of torque is calculated" should be deleted. (two occurrences)
Column 25, Lines 59, Claim 9; and Column 26, Lines 5-6, Claim 10,
 "said estimate of torque is calculated" should be deleted. (two occurrences)

Signed and Sealed this
Nineteenth Day of January, 2016

Michelle K. Lee
*Director of the United States Patent and Trademark Office*